US010402797B2

(12) United States Patent
Efroni et al.

(10) Patent No.: US 10,402,797 B2
(45) Date of Patent: Sep. 3, 2019

(54) SECURED AUTHENTICATION AND TRANSACTION AUTHORIZATION FOR MOBILE AND INTERNET-OF-THINGS DEVICES

(71) Applicant: Cyber Armor Pte Ltd, Singapore (SG)

(72) Inventors: Zvi Efroni, Singapore (SG); Kelvin Yong Kuang Teo, Singapore (SG); Gary Fook Loong Chan, Singapore (SG)

(73) Assignee: Cyber Armor Pte Ltd, Singapore (SG)

( * ) Notice: Subject to any disclaimer, the term of this patent is extended or adjusted under 35 U.S.C. 154(b) by 105 days.

(21) Appl. No.: 15/628,615

(22) Filed: Jun. 20, 2017

(65) Prior Publication Data

US 2017/0364875 A1 Dec. 21, 2017

Related U.S. Application Data

(60) Provisional application No. 62/352,027, filed on Jun. 20, 2016.

(51) Int. Cl.
| | |
|---|---|
| *G06F 21/00* | (2013.01) |
| *G06Q 20/10* | (2012.01) |
| *G06Q 20/12* | (2012.01) |
| *G06Q 20/38* | (2012.01) |
| *G06Q 20/40* | (2012.01) |

(Continued)

(52) U.S. Cl.
CPC .......... *G06Q 20/10* (2013.01); *G06F 21/31* (2013.01); *G06F 21/44* (2013.01); *G06Q 20/12* (2013.01); *G06Q 20/32* (2013.01); *G06Q 20/322* (2013.01); *G06Q 20/385* (2013.01); *G06Q 20/3821* (2013.01); *G06Q 20/3823* (2013.01); *G06Q 20/3825* (2013.01); *G06Q 20/3829* (2013.01); *G06Q 20/38215* (2013.01); *G06Q 20/403* (2013.01); *G06Q 20/42* (2013.01); *H04L 9/0863* (2013.01); *H04L 9/0877* (2013.01); *H04L 9/12* (2013.01); *H04L 9/321* (2013.01); *H04L 9/3228* (2013.01); *H04L 9/3234* (2013.01); *H04L 9/3273* (2013.01); *H04L 63/0823* (2013.01);

(Continued)

(58) Field of Classification Search
CPC .................................................... H04L 63/0823
See application file for complete search history.

(56) References Cited

U.S. PATENT DOCUMENTS

| | | | | |
|---|---|---|---|---|
| 9,843,929 B2 * | 12/2017 | Zimmerman | ............ | H04W 4/70 |
| 9,917,821 B2 * | 3/2018 | Gillmore | ............... | H04L 63/062 |

(Continued)

*Primary Examiner* — Ali Shayanfar
(74) *Attorney, Agent, or Firm* — Horizon IP PTE Ltd.

(57) ABSTRACT

Highly secured transactions for mobile or Internet-of-Things (IoT) devices can be conducted using a one-time seed technology (OTST). For example, registration of a user and authentication of a user device is based on a one-time seed (OTS) which is generated by an authentication server and sent to the user device. The user device employs the OTS to generate a one-time password (OTP). After registration and authentication, the OTS is deleted. As such, the OTS and OTP is used only one time. No seed is stored on the user device. As for securing the transactions, it may be signed by a one-time hash (OTH) or a one-time signing key (OTSK). Like the OTS, the OTH or OTSK is deleted from the user device after the transaction. Since the user device does not contain a seed, OTH or OTSK, there is no risk of the user device being hacked by unwanted third parties.

20 Claims, 13 Drawing Sheets

(51) Int. Cl.
*G06Q 20/42* (2012.01)
*H04L 9/08* (2006.01)
*H04L 29/06* (2006.01)
*G06F 21/31* (2013.01)
*G06Q 20/32* (2012.01)
*G06F 21/44* (2013.01)
*H04L 9/12* (2006.01)
*H04L 9/32* (2006.01)

(52) U.S. Cl.
CPC ...... *H04L 63/0838* (2013.01); *H04L 2209/80* (2013.01)

(56) References Cited

U.S. PATENT DOCUMENTS

| | | | |
|---|---|---|---|
| 10,044,674 B2* | 8/2018 | Liu | H04W 12/06 |
| 10,158,991 B2* | 12/2018 | Link, II | H04W 4/70 |
| 2007/0130472 A1* | 6/2007 | Buer | H04L 63/0428 |
| | | | 713/182 |
| 2013/0151111 A1* | 6/2013 | Skelton | B60R 25/00 |
| | | | 701/99 |
| 2015/0156195 A1* | 6/2015 | Chi | G06F 21/42 |
| | | | 726/5 |
| 2015/0326402 A1* | 11/2015 | Sibert | H04L 9/3271 |
| | | | 713/155 |
| 2016/0112422 A1* | 4/2016 | Watanabe | H04W 12/06 |
| | | | 726/28 |
| 2016/0294817 A1* | 10/2016 | Tan | H04L 63/0838 |
| 2018/0062851 A1* | 3/2018 | Cronholm | H04L 9/3247 |
| 2018/0176017 A1* | 6/2018 | Rodriguez | H04L 63/08 |

* cited by examiner

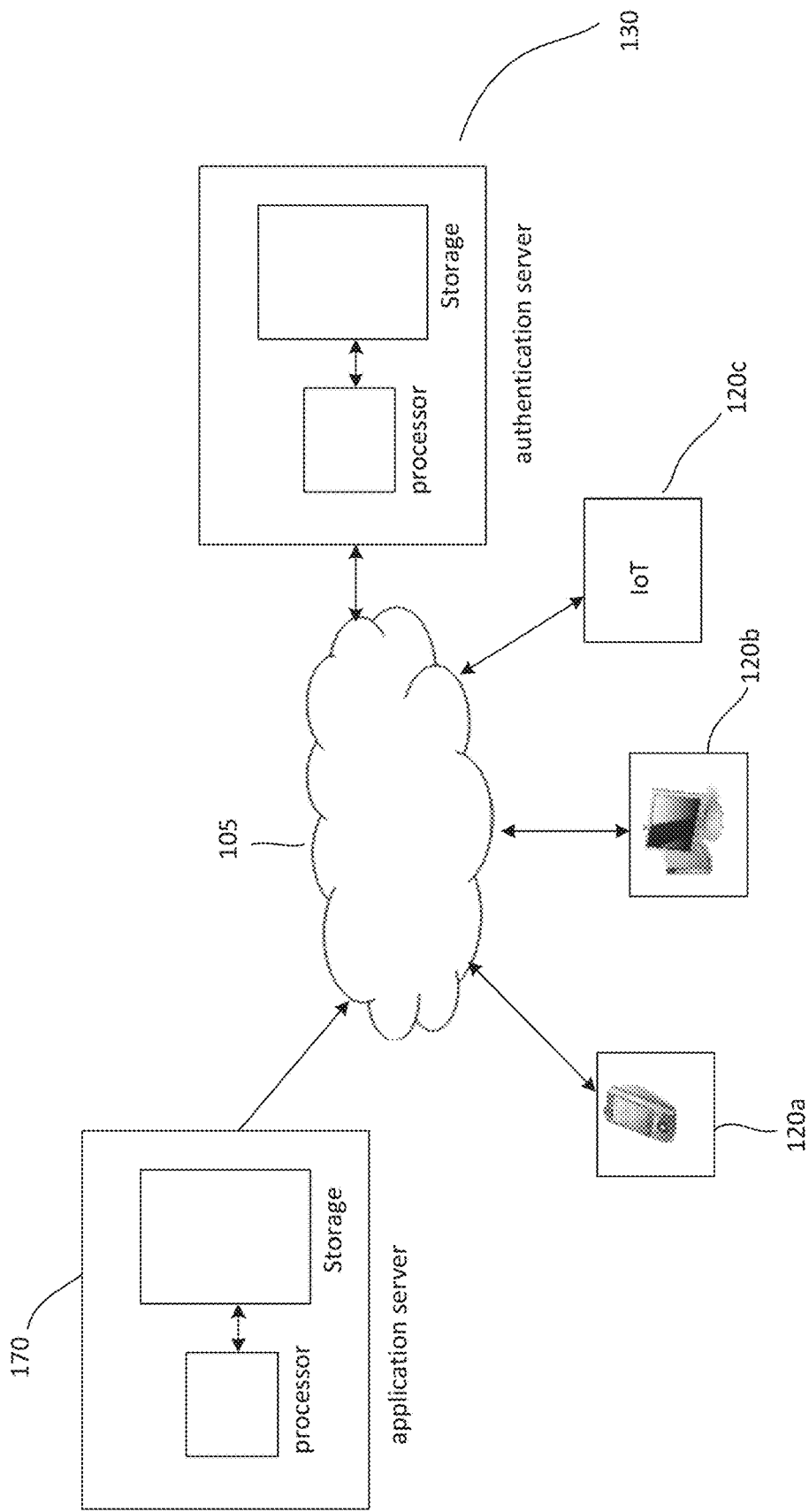

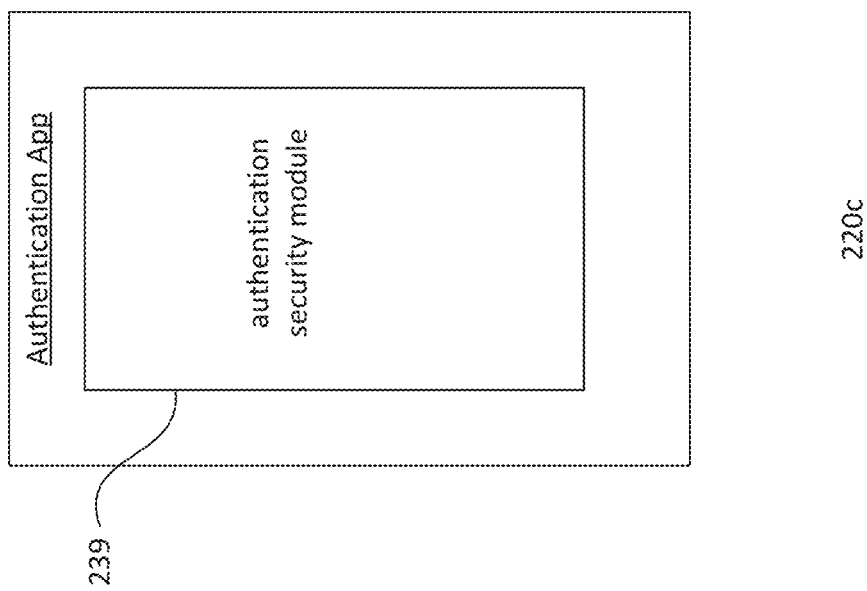

US 10,402,797 B2

SECURED AUTHENTICATION AND TRANSACTION AUTHORIZATION FOR MOBILE AND INTERNET-OF-THINGS DEVICES

CROSS-REFERENCE TO RELATED APPLICATION

This application claims the priority of U.S. Provisional Application No. 62/352,027, entitled "A New Paradigm in Authentication and Transaction Signing for Mobile and Internet-of-Things Device" filed on Jun. 20, 2016, which is herein incorporated by reference in its entirety.

TECHNICAL FIELD

The present disclosure relates generally to transactions for mobile and Internet-of-Things (IoT) devices. In particular, the transactions are highly secured due to the use of a one-time seed.

BACKGROUND

The advances in communication technology has fostered tremendous growth of transactions using mobile or Internet-of-Things (IoT) devices. As an example, on-line banking and other types of transactions using mobile and IoT devices have exploded in recent years. The popularity of transactions using mobile and IoT devices is due to the convenience factor. For example, a user can conduct a transaction virtually anywhere and anytime with the use of a mobile or an IoT device. A major concern, however, with such types of transactions is security. For example, transaction information may be intercepted or illegally obtained by third parties, potentially exposing confidential information, such as personal information, including banking and other sensitive information. Such information, when accessed by unwanted parties, may subject the user to potential risk of identity theft and other fraudulent or criminal activities.

Security measures may be implemented to reduce the risks to a user of transactions using mobile and IoT devices. Conventional security measures include the use of software tokens for transaction signing. Conventional software tokens rely on a seed and a counter, both of which are both resident on a mobile device. The seed and counter are used to generate a one-time password. The seed and counter are securely stored in a user device, such as in a sandbox or a secured container. Although software tokens provide some measure of security, it is prone to hacking by third parties since it is stored in the user's mobile device. For example, malware and other hacking software may be easily employed to hack a user's mobile device to access the seed and counter. This enables unwanted third parties to conduct transactions based on the illegally obtained counter and seed.

Based on the foregoing discussion, there is a need to improve security for transactions using mobile and IoT devices.

SUMMARY

An authentication system for securing transactions between a first party and a second party is described herein. In accordance with one aspect, the system comprises a first party user device which includes a front-end application. The front-end application further includes a front-end transaction module and a front-end security module. The system also comprises a second party server which includes an application server with a back-end application. The back-end application further includes a back-end transaction module and a back-end security module. An authentication system with an authentication security module and a communication network are also included in the system. The first party user device, the second party application server and the authentication server are interconnected by the communication network. The authentication security module of the authentication server performs authentication of the first party user device in response to an authentication request of the first party user device. The authentication includes the authentication security module generating an authentication one-time seed (aOTS) which is sent to the first party user device, the front-end security module of the first party user device generating a user one-time password (uOTP) based on the aOTS and sending the uOTP to the authentication server for verification, the authentication security module generating an authentication one-time password (aOTP) based on the aOTS and comparing the aOTP with the uOTP. If the aOTP matches the uOTP, the first party user device is authenticated. If the aOTP does not match the uOTP, the first party user device is not authenticated. The aOTS and uOTP is then deleted by the front-end security module regardless whether the first party user device is authenticated or not.

In another aspect, a user device is disclosed. The user device includes a user application downloaded from an application server. The user application includes a front-end transaction module for facilitating a transaction with a back-end application on the application server and a front-end security module. In response to receiving a one-time seed (OTS) originating from an authentication server, the front-end security module generates a one-time password (OTP), transmits the OTP to the authentication server for performing an authentication process and deletes the OTS and OTP from the user device regardless whether the authentication process is successful or not.

In yet another aspect, an authentication server for facilitating secured transactions is disclosed. The authentication server includes an authentication security module. An authentication key generator unit generates a user asymmetrical key pair with a user public key and a user private key of a user. The user asymmetrical key pair is generated in response to successful registration of the user. An authentication encryption unit includes an asymmetrical encryption using the user asymmetrical key pair and a symmetrical encryption using a session key from a first party user device. A seed generator unit generates a one-time seed (OTS) which is used by the first party user device to generate a user one-time password (uOTP). A one-time password (OTP) generator unit generates an authentication one-time password (aOTP) based on the OTS. A registration one-time password (rOTP) from the first party user device registering the user is verified against the aOTP using an authentication verification unit. The uOTP for authenticating the first party user device and authorizing a transaction by the user with a second party application server is also verified against the aOTP using the authentication verification unit. The authentication security module then causes the OTS in the user device to be deleted after registration, authentication and transaction authorization.

In yet another aspect, a method of conducting a secured transaction is disclosed. A user device is provided to a user. The user device includes a transaction application downloaded from an application server and installed on the user device, the transaction application includes a transaction module and a front-end security module. The user is registered with the application server. The registration includes providing user information comprising user identification (userID) and user password of the user and information of the user device to the application server. A user public key is stored from the authentication server to the user device upon successful registration. The user public key is part of a key pair. The key pair includes a user private key and the user public key. The user device is authenticated after successful registration using a 2-factor device authentication. A first factor device authentication generates a session key by the user device and encrypts the session key and device information with the user public key for processing by the authentication server. A user one-time password (uOTP) is generated based on a one-time seed (OTS) received from the authentication server upon successful first factor device authentication. The uOTP is used by the authentication server for the second factor device authentication. The OTS is deleted from the user device regardless whether the device authentication is successful or not.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 1 shows an embodiment of an environment;

FIGS. 2a-2c show front-end application, back-end application and authentication application;

DETAILED DESCRIPTION

Figure 2A:
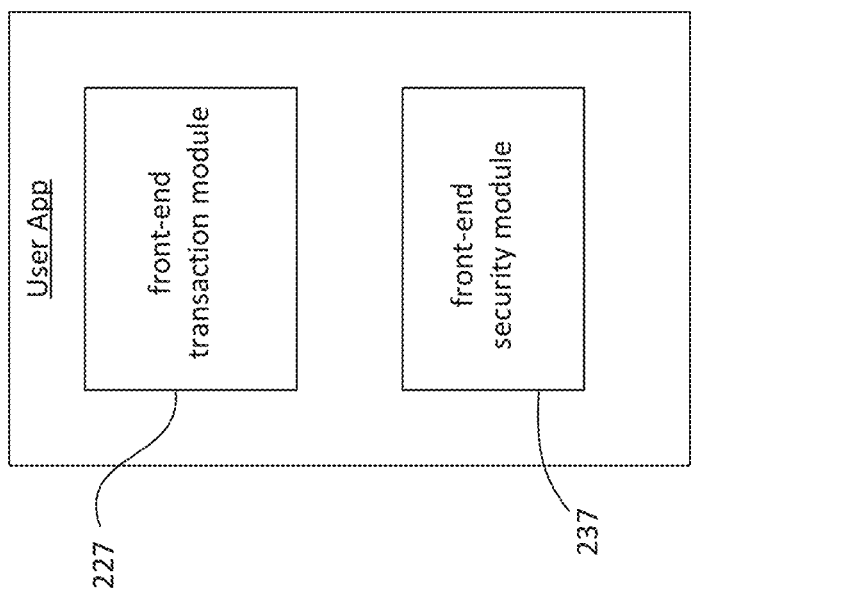

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework for conducting secured transactions using mobile or IoT devices is described herein. The framework provides highly secured transactions without changing user experience. The framework utilizes one-time seed technology (OTST) for authentication. In addition, the framework utilizes one-time transaction authorization technology (OTTAT) using a one-time hash or a one-time signing key to authorize a transaction. The use of OTST and OTTAT avoids the need for storing seeds, private keys and/or signing keys on mobile or IoT devices. Private keys may refer to any type of private keys, signing keys, seeds or hash values stored on a user device. As such, there is no need to implement any form of security to protect the seeds and/or private keys. This results in highly secured transactions since seeds and/or private keys cannot compromised by illegal accesses to the user device.

FIG. 1 shows an exemplary environment 100. The environment, for example, facilitates secured transactions using mobile and IoT devices. The environment includes a communication network 105. The communication network may be, for example, the internet. Other types of communication networks or combination of networks may also useful. An authentication server 130, an application server 170 and a plurality of user devices 120a-c are interconnected through the communication network 105. Although three user devices are shown, it is understood that there may be many more user devices. As shown, the framework includes a distributed or server-client architecture. The framework may be a cloud-based platform.

A server may include one or more computers. A computer includes a memory (storage) and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In the case where the server includes more than one computer, they are connected through a communication network such as an internet, intranet, local area network (LAN), wide area network (WAN), internet or a combination thereof. The servers, for example, may be part of the same private network. The servers may be located in single or multiple locations. Other configurations of servers may also be useful. For example, the servers may form a cloud.

As for user devices, they may be any type of computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include personal computers, laptops, tablets, mobile devices, such as smart phones, and/or IoT devices. Other types of user devices may also be useful.

A user may connect to a server using a user device. The user device may be referred to as the user side while the server may be referred to as the server side. A user may access the server by logging in the user's respective account with, for example, a password using a user device. The user device may have an application interface or user interface (UI) which is used to communicate with the server. Alternatively, a web browser on the user device may be used. Other techniques for accessing the server may also be useful.

A transaction may be conducted between two parties. A first party may be a user, which may be a subscriber, an account holder or a customer, and a second party may be a service provider or vendor. Other types of parties for first and second parties may also be useful. Services may refer to any type of services provided by a second party and a first party may be any type of user which desires the service provided by the second party. In one embodiment, the first party conducts a secured transaction with the second party. A transaction may be any kind of transaction related to the service provided by the second party. A transaction may be an on-line transaction over, for example, the Internet. A transaction may also include other types of transactions, such as a transaction using a connection over other types of networks (a non-online transaction). As examples, transactions may include banking or financial transactions, sales transactions as well as other types of transactions, including member transactions. Transactions may also include other types of transactions, such as transactions using remote access connections, data exchange connections, email connections, document sharing, IoT transactions, as well as other types of transactions. The environment, for example, may be applied to any type of interactions or transactions between any two parties in which strong authentication is desired.

In one embodiment, the application server provides services of the second party. The application server may include an application (server App) which is designed to provide its services. A user may access the application server through a user device to obtain the services provided by the second party. The user device may include a user application (user App) which interacts with the server App to conduct a transaction between the first and second party. The user App, for example, may be a native App, a hybrid App or a web App which is configured to conduct the transaction with the server App. In some cases, the server App may include different configurations, including for different operating systems, to provide flexibility for the user interact with the server App.

As for the authentication server, it facilitates a secured transaction between the first and second parties. For example, the authentication server facilitates transactions between the user App on the first party user device and server App on the second party application server. In one embodiment, the authentication server includes an authentication security App (AS App) which interacts with the user App and server App to facilitate secured transactions using OTST and OTTAT.

As described, the authentication server and application server are separate servers. It is understood that the authentication server and application server may be on the same server network. In some embodiments, the authentication server and application server may be part of a cloud service. In some other embodiments, the authentication server may be a separate service provided by an authentication service provider. Other configurations of the servers may also be useful.

Figure 2B:
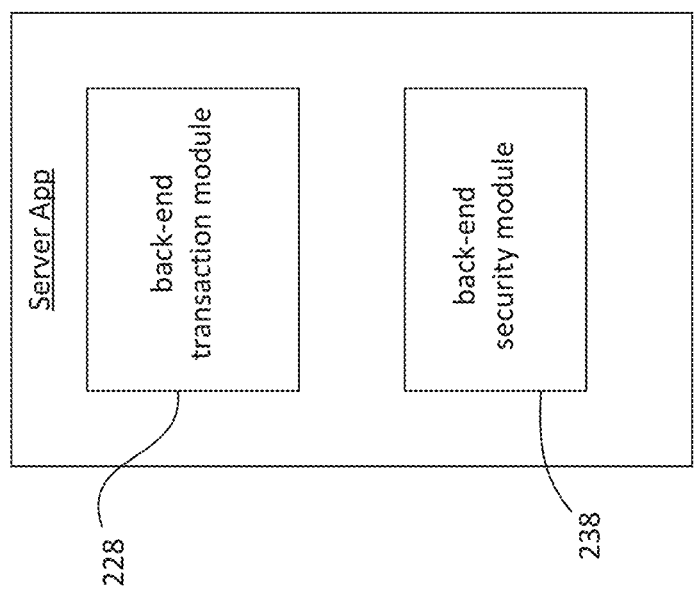

FIGS. 2a-2c show exemplary embodiments of the user App, server App and AS App. Referring to FIG. 2a, a user App 220a is shown. The user App, for example, may be referred to as a front-end portion of the App for conducting a transaction with the server App on the application server. As shown, the user App includes a front-end transaction module 227 and a front-end security module 237. The front-end transaction module is configured to conduct transactions with the server App. As for the front-end security module, it facilitates secured transactions based on OTST and OTTAT. For example, registration, user device authentication or transaction authorization is based on OTST and/or OTTAT.

Referring to FIG. 2b, a server App 220b is shown. The server App, for example, may be referred to as a back-end portion of the App for conducting a transaction between the user App and the server App. As shown, the server App includes a back-end transaction module 228 and a back-end security module 238. The back-end transaction module is configured to conduct transactions with the user App. The back-end transaction module may be configured to conduct transactions with the front-end transaction module. As for the back-end security module, it facilitates secured transactions based on OTST and OTTAT. For example, authentication or transaction authorization is based on OTST and OTTAT. In addition, registration is based OTST.

Referring to FIG. 2c, an authentication App 220c is shown. As shown, the authentication App includes an authentication security module 239. The authentication module is configured to facilitate registering users and authenticating and authorizing transactions between the user App and server App.

In one embodiment, registering a user with the application server involves a 2-factor authentication based on OTST by the authentication server. The first factor authentication verifies "who you are" while the second factor authentication verifies "what you have", such as the user device. For example, second factor authentication verifies the mobile device of the user.

In one embodiment, the first factor authentication includes the authentication server verifying the user based on user information, such as user identification (user ID) and user password. Other types of user information may also be used for first factor authentication. For example, user information may include biometric information of the user, such as fingerprints. In addition, the user may provide user device information as part of the first factor authentication. The user device information may include phone number, push notification information, including SMS and other messaging applications, International Mobile Equipment Identity (IMEI) number, screen dimension as well as unique details pertaining to the device. The back-end authentication server may generate a one-time password (OTP), which is pushed to the user device. The user inputs the OTP and sends it back to the authentication server for verification.

Upon verification, the first factor authentication for registering the user is successful and the second factor authentication commences. This includes, for example, generating an asymmetrical user key pair and a one-time seed (OTS). The public key of the user key pair and the OTS are sent to the user, which generates a one-time password (OTP). The OTP is sent to the authentication server for verification. For example, upon the OTP verification, the OTS is deleted from the user device and the public key is stored in the user device, representing successful registration. On the other hand, if the OTP is not verified, the user device deletes both the public key and OTS, representing unsuccessful registration.

After successful registration, a user device, such as a mobile device, may be authenticated. In one embodiment, device authentication is based on OTST. Authenticating the user device serves as a second factor authentication. For example, the second factor authentication proves to the application server the identity of the user. In one embodiment, the authentication server generates an OTS which is encrypted by a session key from the user device after the user device information form the user device has been verified. The encrypted OTS is sent to the user device, which is used to generate an OTP. The OTP is sent back to the authentication sever for verification. Upon verification of the OTP, the user device is authenticated. Whether the device is authenticated or not, the OTS and session key are deleted from the user device.

In one embodiment, mutual authentication between the user device and authentication server involves a hybrid of both asymmetrical and symmetrical encryptions. For example, session key and device information may be encrypted by asymmetrical encryption using the user public key. As for the OTS, it is encrypted by symmetrical encryption using the session key. The use of both symmetrical and asymmetrical encryption increases security of the authentication. In addition, the use of a session key may improve performance since it may be configured with a shorter length than the user public key. Other configurations of encryptions for authentication may also be useful. In other embodiments, if reduced security is acceptable, mutual authentication may involve only asymmetrical encryption using the public key. In either case, the OTS is removed from both the user device and authentication server after authentication.

As for transaction authorization, in one embodiment, it is based on OTTAT. Transactions may be conducted by a user using an authenticated or a known device. The OTTAT may build on OTST. The OTTAT includes two main approaches. The first OTTAT approach involves a one-time hash (OTH) and the second approach involves a one-time signing key (OTSK). Both approaches employ second factor authentication of the transaction. For example, both approaches require authentication of the transaction based on or involving an authenticated or known device of the user.

The OTTAT also supports transactions conducted using an unauthenticated or unknown device. For example, the unknown device may be a laptop, desktop computer or even another mobile device. Transactions on an unknown device may be initiated using a browser on the unknown device. In one embodiment, a transaction conducted on an unknown device is facilitated by the known device of the user.

With respect to OTH, it is based on OTST. For example, the OTH, which serves as an OTS, is generated by the authentication server. The OTH is based on transaction information of the transaction which may be sent securely to the authentication server. For example, the transaction information may be encrypted using a session key and the session key may be encrypted using the user's public key before sending to the authentication server. In the case of conducting a transaction on an unknown device, the user's public key can be exported from the authentication server after successful login. The public key may be stored in the browser of the unknown device for encrypting the transaction information before it is submitted.

The OTH is sent to the user device. The OTH may be secured by encrypting it with a session key from the user device. The user device decrypts the OTH from the authentication sever and generates an OTP based on the OTH and sends it to the authentication server for verification. With this second factor authentication of the transaction, it is proof that the user has confirmed the transaction. For example, if verified, the transaction is authorized or confirmed. If not, the transaction is not authorized. In either case, the OTH and session key are deleted from the user device.

As for OTSK, unlike OTH, it is not based on an OTST. Transaction information may be securely provided to the authentication server. The transaction information may be encrypted using a session key and the session key may be encrypted using the user's public key. In the case of conducting a transaction on an unknown device, the user's public key can be exported from the authentication server and stored in the browser of the unknown device for encrypting the transaction information before it is submitted.

The OTSK is randomly generated by the authentication server in response to receiving the encrypted transaction information. The OTSK includes a private OTSK and a private OTSK. The private OTSK is used by the user to sign the transaction. The private OTSK may be encrypted by the authentication server using a session key provided by the user device. The OTSK is decrypted by the user device using the session key for signing the transaction information. For example, the private OTSK serves as an electronic signature of the user. The signed transaction information is sent to the authentication and the private OTSK is verified using a public OTSK. In some cases, if the transaction information is too large, the authentication server may hash the transaction information and the user signs the hashed transaction information with the private OTSK. With this second factor authentication of the transaction, it is proof that the user has confirmed the transaction. For example, if verified, the transaction is authorized or confirmed. If not the transaction is not authorized. In either case, the OTSK and session key are deleted from the user device and the authentication server.

The use of second factor authentication for authorizing a transaction increases the security of the transaction. After a transaction is authorized, decrypted transaction information is passed to the application server by the authentication server to complete the transaction between the user device and application server. In addition, as described, both symmetrical and asymmetrical encryption is employed which increases security of the authentication. Also, the use of a session key may improve performance since it may be configured with a shorter length than the user public key. Other configurations of encryptions for authentication may also be useful. In other embodiments, if reduced security is acceptable, mutual authentication may involve asymmetrical encryption using the public key. In either case, the OTS is removed from both the user device and authentication server after authentication.

Authentication and transaction authorization are described in context with a second factor authentication. However, authentication and transaction authorization may include a first factor authentication. The first factor authentication may be conducted manually or automatically. Manual first factor authentication may include requesting the user to log into the application server while automatic first factor authentication may be based on user login information stored in the user device. In other embodiments, the first factor authentication may be ignored.

Furthermore, as described, the OTS requires the use of a user's public and private key pair. For example, each user is associated with a public and private key pair used in an asymmetrical encryption. For example, the public key is exported to the user device while the private key is retained in the authentication server. A hardware security module (HSM) may be employed to randomly generate the key pair. For example, the authentication security module may include the HSM. The HSM may be configured to generate keys of the key pair with a predefined length. The predefined length may depend on the desired security level desired. The longer the key length, the higher the security. However, with longer key lengths takes, encryption and decryption times are longer.

The HSM may be, for example, a commercially available HSM, such as those provided by Gemalto, Thales or Utimaco. Other types of HSM may also be useful. The HSM may be implemented to communicate via the communication network. This enables the HSM to support multiple client/user connectivity. The network-attached HSM may function as a pseudo smart card for each of the entities connected on the network. In addition, the HSM can store millions of keys for large deployment.

The authentication server with the HSM may also be configured as a cloud authentication service. This avoids the service provider from maintaining the authentication infrastructure. Furthermore, the cloud configuration ensures high availability of authentication service with virtually limitless storage of the number of keys.

The presently described OTST avoids the need to store a seed on the user device. This alleviates the concern that the seed may be compromised. In one embodiment, the only thing stored in the user device is the public key. As such, there can be no compromise as to security since this is only a public key. Furthermore, the system can be configured to export the public key each time authentication is required. Such a configuration would result in neither the seed nor the public key being stored in the device. Since OTP is based on a newly generated seed, there is no counter synchronization issues. As described, the seed is generated by the authentication server. The decoupling of the seed to the user device allows the operating system to be upgraded without affecting authentication.

In one embodiment, the authentication security module includes an authentication key generator unit, an authentication encryption unit, a seed generator unit, an OTSK generator unit, an authentication verification unit an authentication OTP generator unit, a user information database and an OTP database. The front-end security module, in one embodiment, includes a session key generator unit, a front-end encryption unit, an OTSK signing unit and a front-end OTP generator unit. As for the back-end security module, it includes a back-end verification module. The back-end verification module may include units which provide information from the user device to the authentication server for verification. In addition, the back-end verification module may include units for submitting information form the user device to the authentication server as well as information from the authentication server to the user device. Providing the various security modules with other types of units may also be useful. The units of the different modules interact to facilitate authentication and transaction authorization.

The seed generator unit of the authentication server generates a seed which is used to generate an OTP. The seed generator unit can generate seeds of different lengths. For example, different length seeds may be generated based on the type of transaction or desired security level. The higher the desired security level, the longer the seed. Different seed generation processes may be employed to generate seeds of different lengths. For example, the seed generator unit may include different processes for generating different length seeds. The seed generator unit may be configured to generate a seed with the desired or predefined length. The predefined length, for example, may depend on the desired security level.

In one embodiment, the front-end and authentication OTP generator units include the same OTP generating process or technique for generating OTPs. The front-end and authentication OTP generator units generate the OTP based on OTS. In other words, when using the same OTS, the generator units both generate the same OTP. The OTP generating technique may be a time-based or an event based OTP generating technique. In the case a time-based OTP generating technique is employed, the clocks of the user device and authentication server are synchronized. For example, the clocks may be synchronized to the same communication network, such as the Internet. Other techniques for synchronizing the clocks of the user device and authentication server may also be used.

The OTP database may be used to temporarily store a push OTP generated for a user registration process. The push OTP stored in the database may be encrypted. Since this OTP is encrypted by the authentication server, the authentication server can decrypt the OTP when needed. After successful registration, the push OTP is deleted. The user information database stores details of the users. Such information may include user IDs, user passwords, and user device details of the users. User device details may include mobile phone details, such as the phone number, push messaging contact information, IMEI number, screen dimension, as well as other unique details pertaining to the device. Each user is associated with a User ID, user password and details of the user device. The user information stored in the user information database, in one embodiment, is encrypted.

The session key generator unit of the front-end security module is used to generate a session key for authentication and transaction authorization. The session key is a symmetrical key. For example, the session key is generated by the user device and a copy is sent to the authentication server. The session key is used for encrypting and decrypting information by both the user device and authentication server. In one embodiment, the session key may be a 3DES based session key generator unit for symmetrical encryption. Other types of symmetrical key generators may also be used. The session key generator unit randomly generates a session key for each session. The session key generator unit may be configured to generate a session with a predefined length. The predefined length depends on, for example, the desired security level. Typically, the session key is configured to have a shorter length than the user key pair. Other configurations of session keys may also be useful.

The authentication key generator unit generates keys for use in encrypting and decrypting information. In one embodiment, the authentication key generator unit includes asymmetrical key generator for randomly generating key pairs. A key pair includes a first key and a second key. A first key is used by the authentication server and a second key is sent to the user device. The first key may be referred to as a private key while the second key may be referred to as a public key. A key pair is generated for use between communication between a user and authentication server upon a registration request of a user for the application server. For example, upon a successful registration by a user, the authentication key generator unit generates a private key and a public key pair for the registered user.

The key generator unit may employ RSA technology to generate the key pair. For example, the key pair includes a RSA public key and a RSA private key. Other techniques or technologies for generating the key pair may also be useful. The key generator unit may be configured to generate a key pair with keys having a predefined length. The predefined length may depend on, for example, the desired security level. The longer the key length, the higher the security. In one embodiment, the keys of the user key pair are configured with a longer length than a session key. Other configurations of the session key and user key pair may also be useful. In one embodiment, the private key is retained by the authentication server and the public key is sent and stored in the user device.

The various keys are employed for encrypting and decrypting information by the front-end and authentication encryption units. In one embodiment, an encryption unit includes first and second encryption sub-units. The first encryption sub-unit may be an asymmetrical encryption sub-unit used for asymmetrical encryption and decryption of information; the second encryption sub-unit may be a symmetrical encryption sub-unit used for symmetrical encryption and decryption of information. The asymmetrical encryption sub-unit may be a RSA based encryption sub-unit and the symmetrical sub-unit may be a 3DES based encryption sub-unit. Other types of asymmetrical or symmetrical encryption sub-units may also be employed.

The OTSK generator unit of the authentication server generates an OTSK for authorizing a transaction. The OTSK generator unit is an asymmetrical key generator. For example, a first OTSK and a second OTSK is generated. The first OTSK may serve as a private key of the OTSK and the second OTSK may serve as a public key of the OTSK. The first OTSK is sent to the user for signing using the OTSK signing unit in the front-end security module and the second OTSK is employed by the authentication server for verifying the signature using the first OTSK. The OTSK generator unit, for example, may be a RSA based OTSK generator unit. Other types of OTSK generator units, such as ECC or other types of signing technology, may also be employed.

The authentication verification unit verifies various information received from the user. The information is received from the user via the application server. In one embodiment, the verification unit includes an OTP verification sub-unit, a user device verification sub-unit and a signature verification sub-unit. The OTP verification sub-unit verifies whether the OTP received from the user device is correct. The OTP may be retrieved from the OTP database or generated based on the OTS. The user device verification sub-unit verifies that the user device information received matches that stored in the user information database of the authentication server. These various sub-units transfer information from the user device to the authentication server. The application server may also include one or more types of notification sub-units which passes information from the authentication server to the user device.

As discussed, information between the user and authentication server is facilitated by the application server. For example, the back-end verification module of the application server facilitates communication between the user and authentication server. In one embodiment, the back-end verification module includes a user registration verification sub-unit, a user device verification sub-unit, an OTP verification sub-unit, a signature verification sub-unit, a get public key sub-unit and a submit transaction sub-unit. The user device verification sub-unit is configured to pass user device information to the authentication server for verification. As for the OTP verification sub-unit, it passes the OTP from the user device to the authentication server for verification. The signature verification sub-unit passes the signed transaction from the user device to the authentication server for signature verification. As for the get public key sub-unit, it retrieves the user's public key from the authentication server for the user device, such as an unauthenticated user device. The submit transaction sub-unit submits transactions to the authentication server for verification.

Although various units of a server or user device are described as separate units, it is understood that some units may be integrated together. Other configurations of units may also be useful.

Figure 3A:
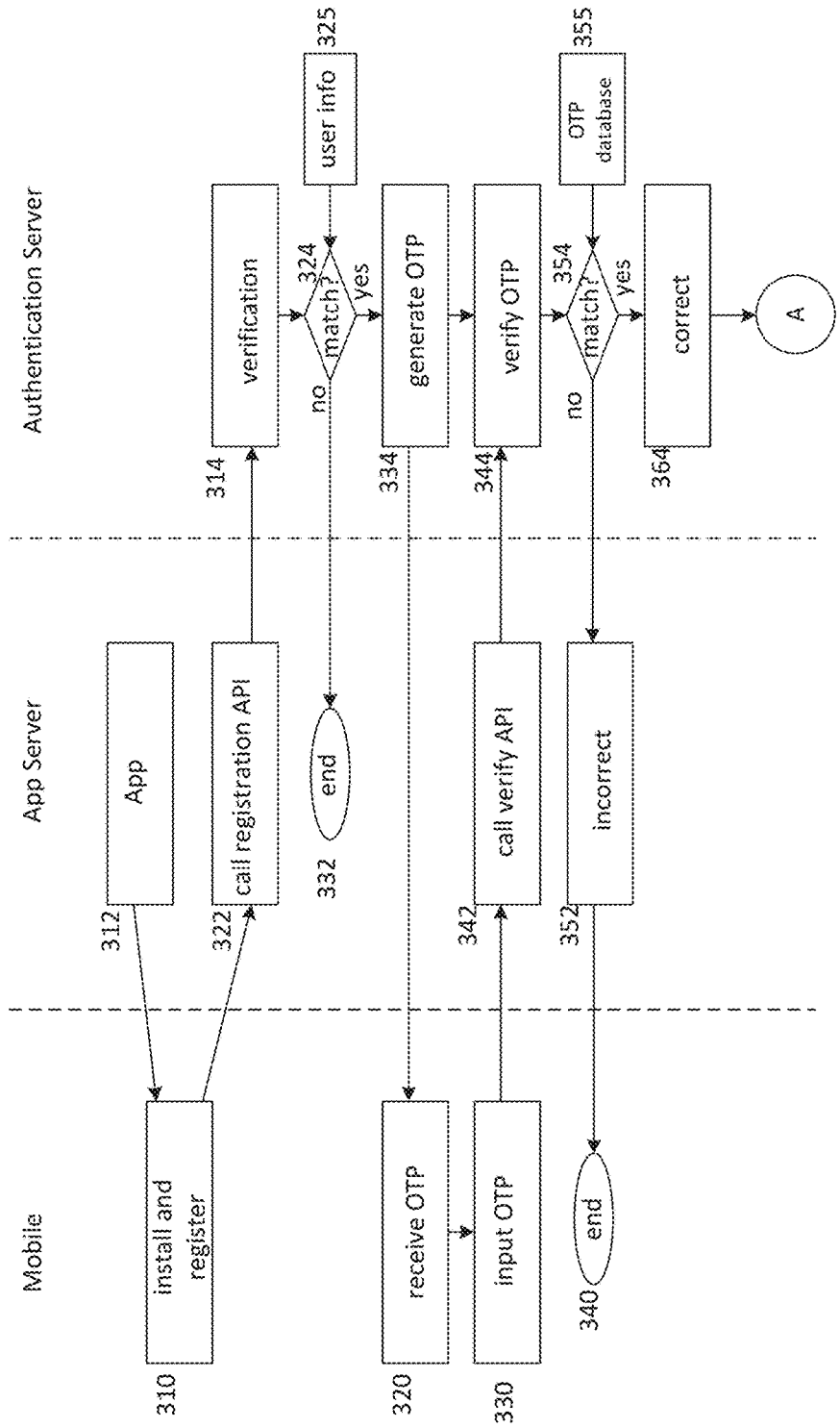
FIGS. 3a-3b show an embodiment of a registration process flow.
Figure 3B:
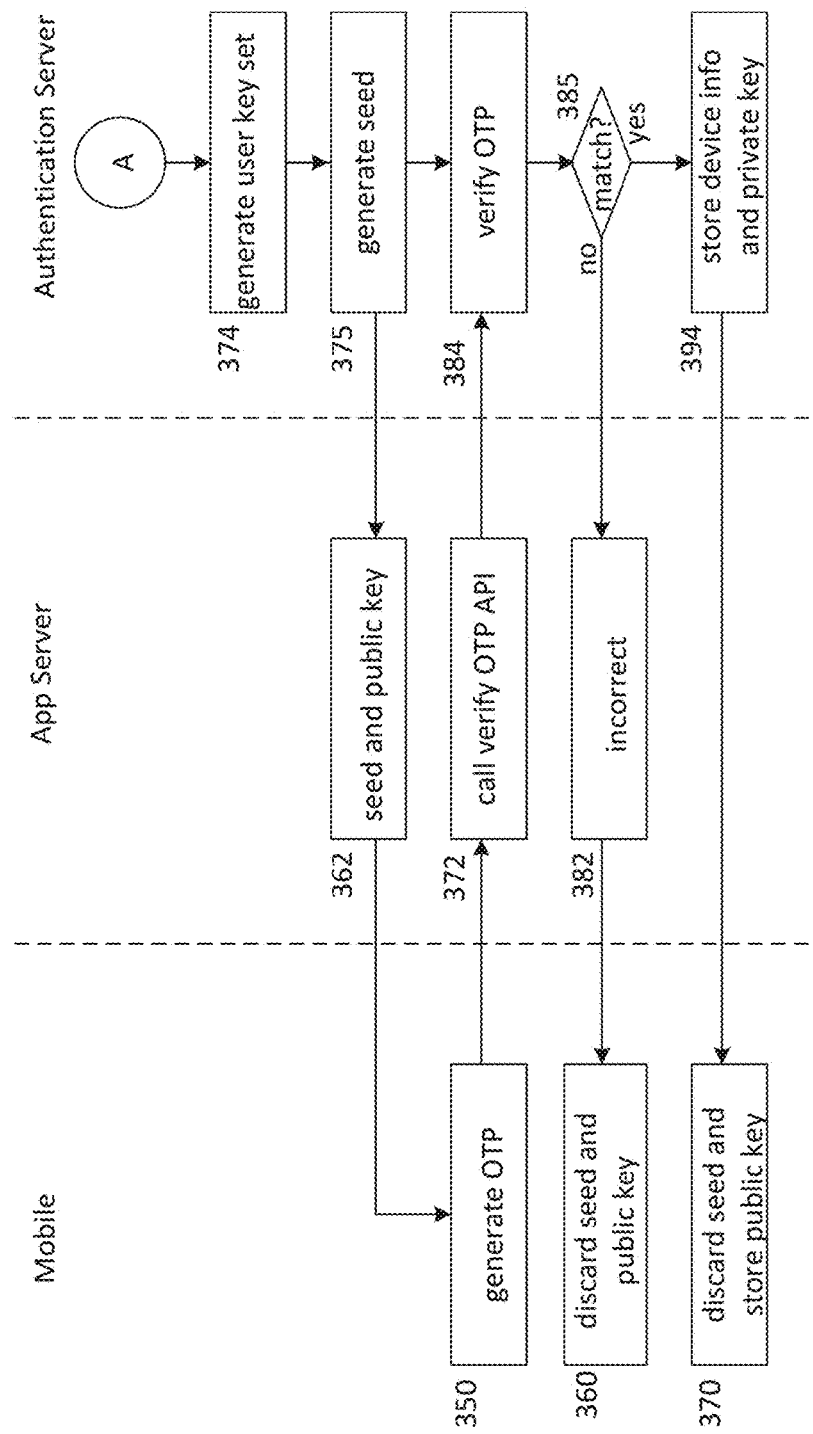

FIGS. 3a-3b show an embodiment of a registration process flow 300. The process flow illustrates the flow among the user device, the application server and the authentication server. At 310, a user may desire to request services from a service provider. The user, through the user device, downloads a service application (App) 312 from the application server. In one embodiment, as part of the request and/or download process, user information may be obtained by the application server, which is passed to the authentication server. The user information may include user ID and password. Providing other types of user information may also be useful. For example, user information may include biometric information of the user, such as fingerprints. In addition, the user may provide user device information as part of the first factor authentication. The user device information may include phone number, push notification information, including SMS and other messaging applications, as well as other device information.

The App is installed on the device. The installation process may require a registration process 322. For example, user ID and password may be requested from the user. In addition, device information of the user may be requested or obtained as part of the registration process. For example, mobile phone details may be provided. The user information is passed to the authentication server to be verified at 314, for example, by the user registration verification sub-unit of the application server. In one embodiment, the authentication server includes a call user registration verification application program interface (API) which requests the authentication server to verify the user information.

The authentication server retrieves user information of the user from the user information database 325. In the case the user information is encrypted, the authentication server decrypts the user information for verification with the user information provided by the application server. At 324, the authentication server determines if the user information from the application server matches the user information from the user information database. If the information does not match, the authentication server passes the results to the application server, which terminates the registration process at 332. At this point, the user may reinitiate the registration process to provide correct user information or request for resetting user information, such as user password.

On the other hand, if the information matches, the information is verified. The authentication server generates an OTP. For example, the authentication OTP generator unit generates an OTP at 334. This OTP, however, is not based on a seed. For example, the OTP generator unit includes a non-seed dependent OTP process for generating an OTP. The OTP is sent to the user device, such as the mobile device. For example, the OTP may be pushed to the user device by an SMS or other types of push notification applications. Other processes for pushing the OTP to the user device may also be useful. The non-seed based OTP may be temporarily stored in an OTP database. The non-seed based OTP may be encrypted and temporarily stored in the OTP database.

The user device, at 320, receives the non-seed based OTP from the authentication server. Although the OTP is sent the user device directly from the authentication server, it may be sent indirectly via the application server. The user inputs the received OTP into the device at 330. The OTP is sent back to the authentication server for verification. In one embodiment, the OTP from the user is forwarded to the application server at 342 by the OTP verification sub-unit of the application server. In one embodiment, the authentication server includes a call OTP API which requests the authentication server to verify the OTP at 344.

The authentication server, at 354, retrieves the non-seed based OTP from the OTP database 355. If the OTP retrieved from the OTP database is encrypted, it is decrypted. After decryption, the OTP from the database is compared with the OTP received from the user device at 354. For example, the OTP from the database is compared with the OTP received from the user device via the application server. If the OTPs do not match, the authentication server informs the application server at 352 which terminates the registration process on the user device at 340.

On the other hand, if the OTPs match, the authentication server proceeds to 364. The authentication server, in response to receiving a correct OTP from the user device, generates a user key pair at 374. For example, the authentication key generator unit generates a private and public key used for asymmetrical encryption. The authentication server generates a seed at 375. The seed, in one embodiment, is generated by the seed generator unit of the authentication server. The public key and the seed are passed to the back-end application server at 362, which passes it to the user device.

The user device uses the seed to generate an OTP at 350 with the front-end OTP generator unit. The OTP is passed to the application server at 372. The application server, passes the OTP from the user device to the authentication server. In one embodiment, the call OTP verification API requests the authentication server to verify the OTP.

The authentication server, at 384, verifies the OTP from the user device. In one embodiment, the OTP verification process includes the authentication server generating an OTP based on the seed using the authentication OTP generator unit. The OTP generated by the authentication server is compared with the user generated OTP at 385. If the OTPs do not match, the authentication server informs the application server at 382. This causes the user device to discard the seed and public key from the authentication server at 360.

In the case the OTPs match, the user is successfully registered. The authentication server stores the user device information and private key at 394. After successful registration of the user and user device, the user device discards the seed and stores the public key at 370.

Figure 4:
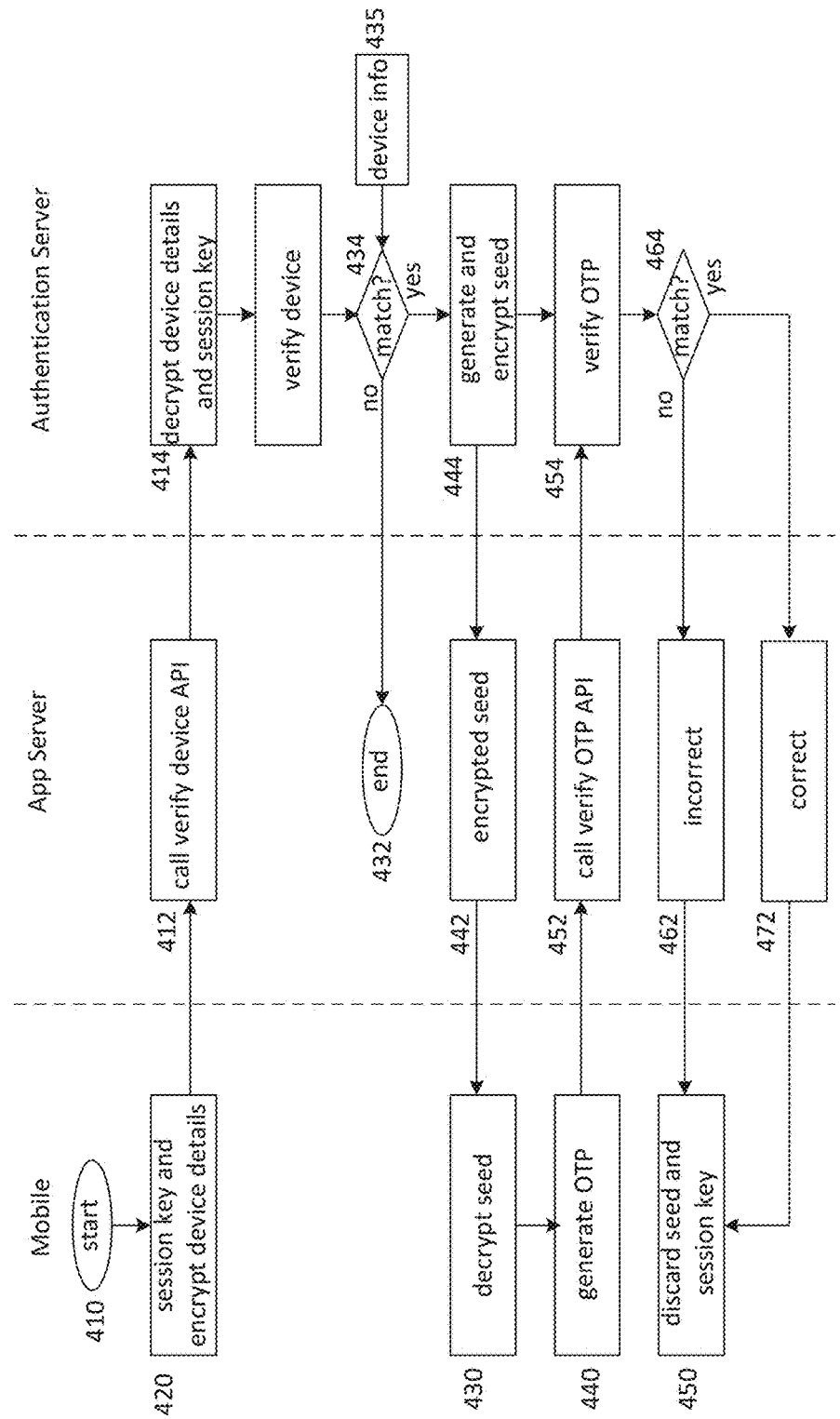
FIG. 4 shows an embodiment of an authentication process flow.

FIG. 4 shows an embodiment of a user device authentication flow 400. The process, for example, ensures that a user device is authenticated. A user may initiate the App on the user device, such as a mobile device, at 410. Initiating the App causes a session key to be generated at 420. The session key, for example, is generated by the session key generator of the front-end security module of the front-end App. The session key, for example, may be a 3DES session key. Other types of session keys, such as synchronous encryption keys, may also be useful. The user may be requested to provide user device details, such as mobile phone details. This may include, mobile phone number, push notification information, including SMS and other messaging applications, IMEI number, screen dimension as well as unique details pertaining to the device. The user may be requested to provide other types of information or device information as well. The information may be provided using a dialog box or input form. Other techniques for obtaining information may also be employed.

As previously discussed, the user device, such as the mobile user device, includes a public key, such as a public RSA key, generated by the authentication server. In one embodiment, the user device information and session key are encrypted using the public key from the authentication server.

The encrypted information (mobile device information and session key) is passed to the application server at 412. In one embodiment, the user device verification sub-unit includes a call verify device API which passes device information to the authentication server for verification. The authentication server decrypts the user device information and session key using the private key associated with the user's public key at 414. The authentication proceeds to verify the user device information, such as mobile phone information at 424.

The authentication server retrieves user device information of the user from the user information database 435. In the case the user device information is encrypted, the authentication server decrypts the user device information for verification with the user device information provided by the application server. At 434, the authentication server determines if the user device information from the application server matches the user device information from the user information database. If the information does not match, the authentication server passes the results to the application server, which terminates the authentication process at 432. At this point, the user may reinitiate the registration process to provide correct user device information. If the user device information in the user information database is incorrect, the registration process may be reinitiated to provide the correct user device information.

On the other hand, if the information matches, the information is verified. The authentication server generates a seed at 444. For example, an OTS is generated by the seed generator unit. The OTS is encrypted. In one embodiment, the OTS is encrypted with the session key provided by the user device. The encrypted seed is forwarded to the application server at 442 which is passed to the user device.

The user device decrypts the OTS with the session key at 430. The decrypted OTS is used to generate an OTP at 440. The OTP is generated by the front-end OTP generator unit using the OTS. The OTP is passed to the application server at 452. The application server, passes the OTP from the user device to the authentication server. In one embodiment, the call OTP verification API of the OTP verification sub-unit requests the authentication server to verify the OTP.

The authentication server, at 454, verifies the OTP from the user device. In one embodiment, the OTP verification process includes the authentication server generating an OTP based on the seed using the authentication OTP generator unit. The OTP generated by the authentication server is compared with the user generated OTP at 464. If the OTPs do not match, the authentication server informs the application server at 462 that the authentication has failed. This causes the user device to discard the seed and session key from the authentication server at 450. If the OTPs match, authentication is successful at 472. This also causes the user device to discard the seed and session key at 450.

Figure 5:
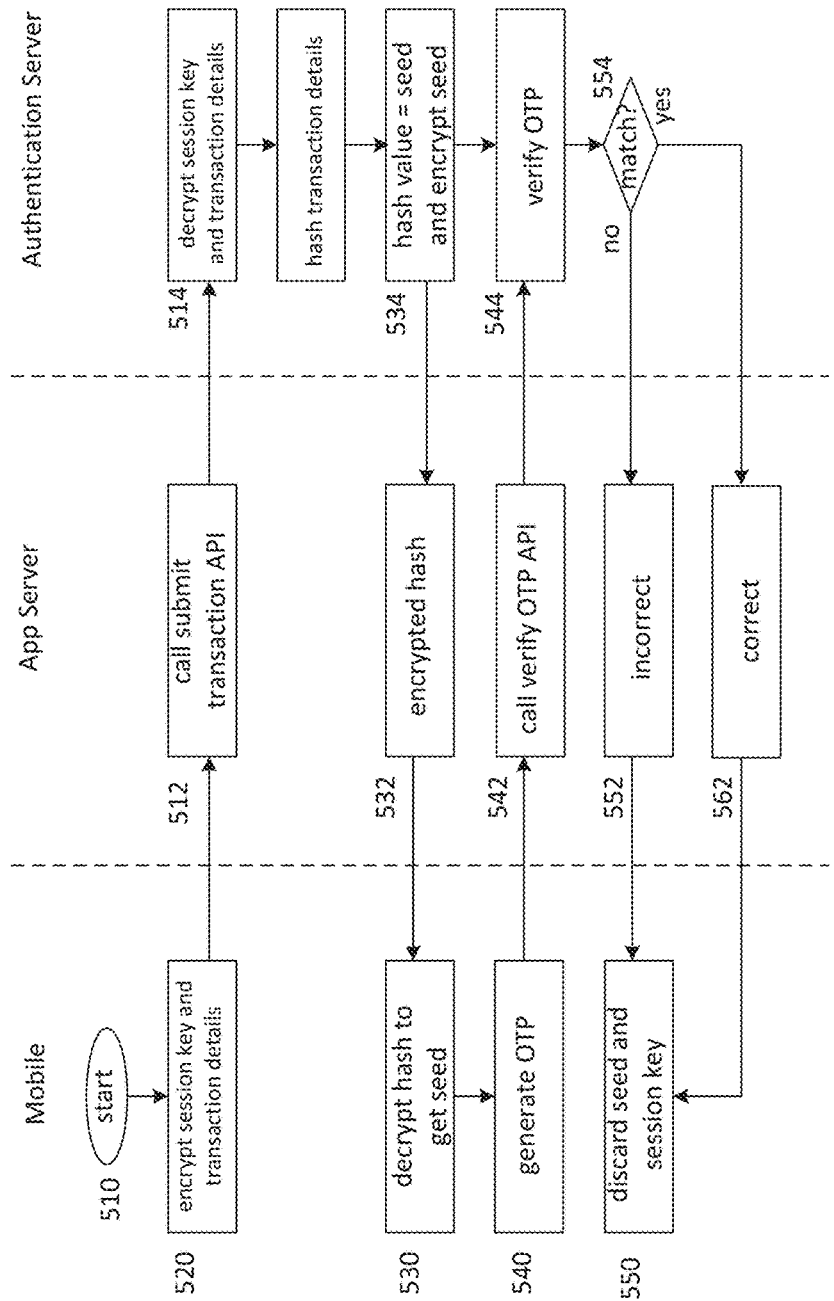
FIG. 5 shows an embodiment of a transaction authorization process flow using a one-time seed with a one-time hash.

FIG. 5 shows an embodiment of a transaction authorization flow 500 using an OTH. The process, for example, authorizes a transaction between a user device and an application server. A user may initiate the App on the user device, such as a mobile device, at 510 to conduct a transaction with the application server. Initiating the App causes a session key to be generated at 520. The session key, for example, is generated by the session key generator of the front-end security module of the front-end App. The session key, for example, may be a 3DES session key. Other types of session keys, such as synchronous encryption keys, may also be useful.

The user initiates a transaction. The information or details of the transaction are created as part of the transaction. The transaction information may be provided using various techniques or a combination of techniques. For example, clicking, dialog boxes or input forms or a combination thereof may be employed to provide transaction information. Other techniques for obtaining information may also be employed. The transaction information is encrypted with the session key. In addition, the session key is encrypted using the public key stored in the user mobile device. In other embodiments, the session key and transaction information may be encrypted using the user public key.

The encrypted transaction information and session key are submitted to the authentication server via the application server. In one embodiment, a call submit transaction API of the submit transaction unit transmits the encrypted information to the authentication for processing at 512. In one embodiment, the authentication server, at 514, decrypts the session key using the private key on the authentication server and decrypts the transaction information using the decrypted session key.

The authentication server, at 524, hashes the transaction details to obtain a hash value. The hash value, in one embodiment, serves as an OTS. For example, the OTS is generated by hashing the transaction details instead of the seed generator unit. The hash value is encrypted at 534. In one embodiment, the hash value is encrypted with the session key. Encrypting the hash value using other encryption keys, such as the private key, may also be useful. The encrypted hash is passed to the application server at 532 which is transmitted to the user device at 530.

The user device decrypts the hash value, for example, with the session key. The decrypted hash value or OTH, as discussed, serves as an OTS, is used to generate an OTP at 540. The OTP is generated by the front-end OTP generator unit using the hash value. The OTP is passed to the application server at 542. The application server, passes the OTP from the user device to the authentication server. In one embodiment, the call verify OTP API of the OTP verification sub-unit requests the authentication server to verify the OTP.

The authentication server, at 544, verifies the OTP from the user device. In one embodiment, the OTP verification process includes the authentication server generating an OTP based on the hash value using the authentication OTP generator unit. The OTP generated by the authentication server is compared with the user generated OTP at 554. If the OTPs do not match, the authentication server informs the application server at 552 that the transaction has not been authorized. This causes the user device to discard the hash value and session key from the authentication server at 550. If the OTPs match, authentication is successful at 562. This also causes the user device to discard the hash value and session key at 550.

Figure 6A:
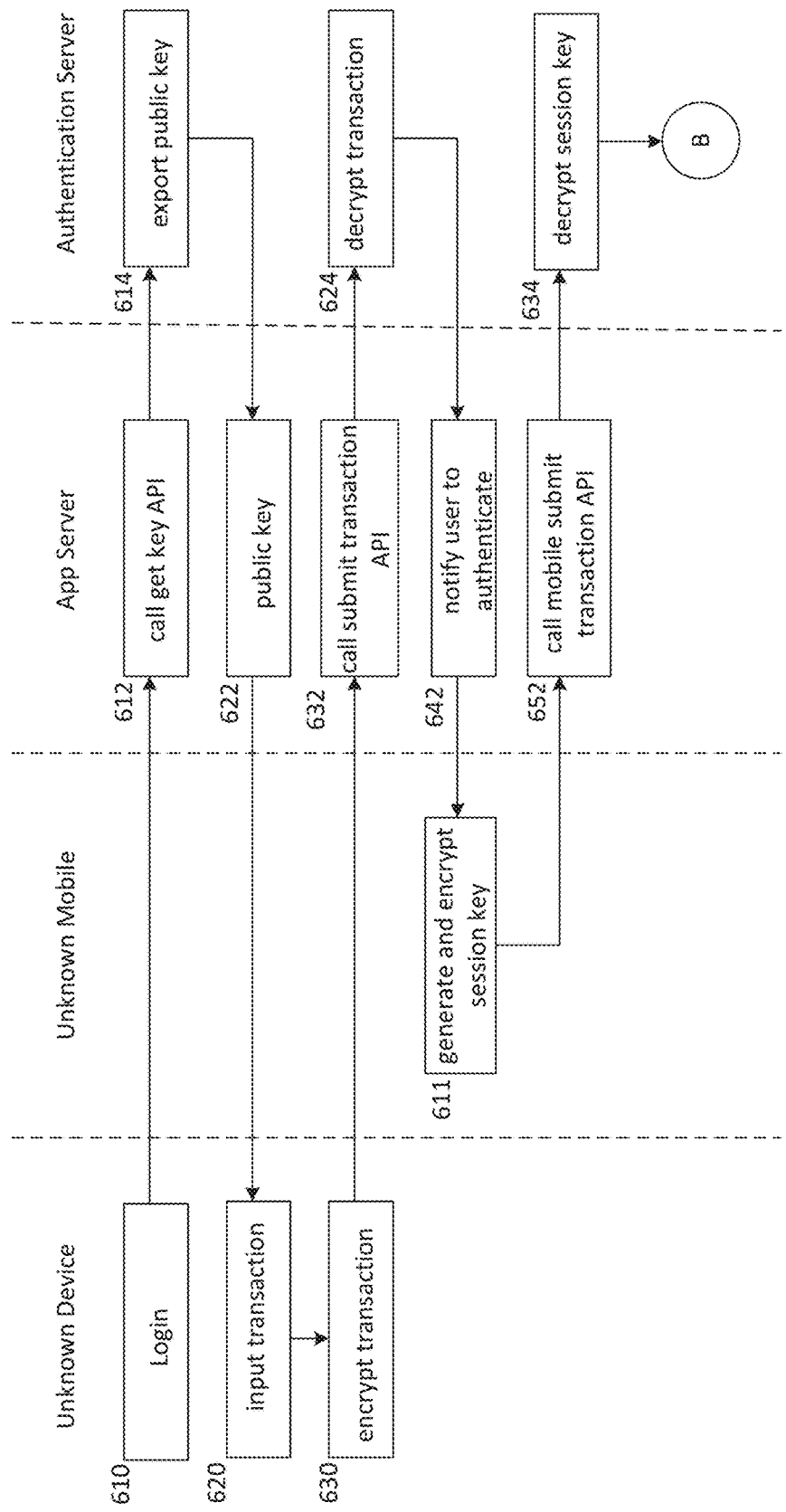
FIGS. 6a-6b show another embodiment of a transaction authorization process flow using a one-time seed with a one-time hash.
Figure 6B:
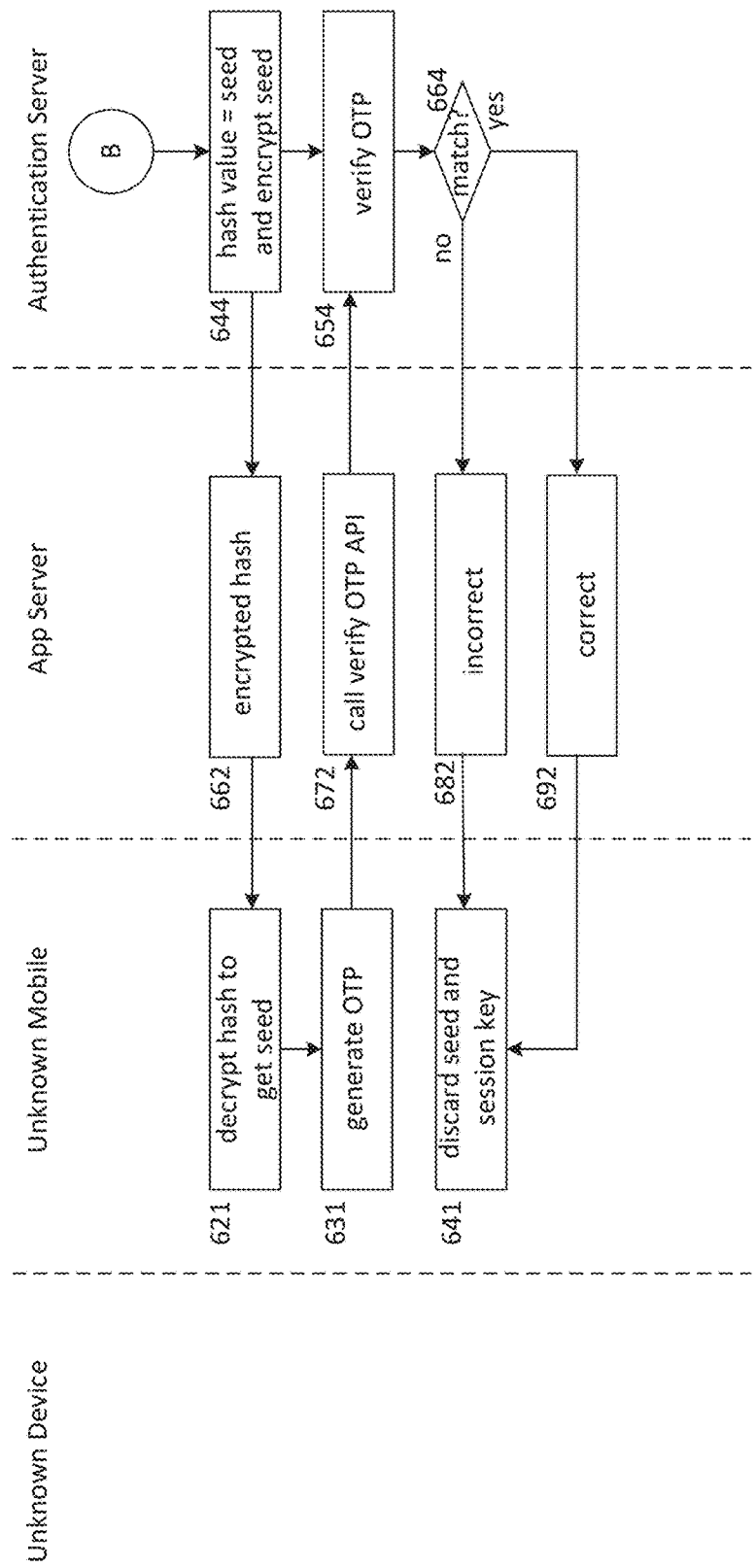

FIGS. 6a-6b show an embodiment of a transaction authorization flow 600 using an OTH. As shown, the process may be performed or on an unauthenticated device, such as a device which is not known by the user or the system. In such case, the user may have the mobile or authenticated device present. The process is initiated on an unknown device at 610. The device may be a desktop device, a laptop device, a tab device, a mobile device or another type of device which is unknown or unauthenticated. Since the unknown device is unauthenticated, the user must log into the application server using the user ID and password. For example, the user may direct the browser to the web-page of the application server to perform the login process to the application server.

Upon successful login by the user, the application server requests the authentication server for the user's public key at 612. For example, the application server initiates a call get public key API to the authentication server. The authentication server, at 614, exports the user's public key. The public key is passed to the application server at 622, which then is transmitted to the unknown device. The public key, for example, is stored in the browser of the unknown device at 620.

By successfully logging in to the application server, the user can conduct the transaction with the application server. The transaction information is encrypted using the public key of the user at 630.

The encrypted transaction information is submitted to the authentication server via the application server. In one embodiment, a call submit transaction API of the submit transaction unit at 632 transmits the encrypted information to the authentication server for processing. The authentication server, at 624, decrypts the transaction information using the user's private key stored in the authentication server. For example, the keys are stored in the user information database along with other information of the user.

The authentication server notifies the application server for the user to authenticate the transaction from an unknown device at 642. The application server passes the notification to the mobile user device. For example, the user is notified using push notification to activate the App to authenticate the transaction. In response, the front-end application generates a session key at 611. The session key is encrypted with the user's public key. The encrypted session key is passed to the authentication server via the application. The application server passes the encrypted session key to the authentication server by a call mobile submit transaction API at 652.

The authentication server, at 634, decrypts the session key. The session key is decrypted using the private key. The authentication, at 644, hashes the transaction details to obtain a hash value. The hash value, in one embodiment, is an OTH and serves as an OTS. For example, the OTS is generated by hashing the transaction details instead of the seed generator unit. The OTH is encrypted with the session key.

In one embodiment, the OTH is encrypted with the session key. Encrypting the OTH using other encryption keys may also be useful. The encrypted OTH is passed to the application server at 662 which is transmitted to the user mobile device (authenticated device).

The user mobile device decrypts the OTH, for example, with the session key at 621. The decrypted OTH is used to generate an OTP at 631. The OTP is generated by, for example, the front-end OTP generator unit using the OTH. The application server, passes the OTP from the user device to the authentication server. In one embodiment, the call verify OTP API of the OTP verification sub-unit requests the authentication server to verify the OTP at 672.

The authentication server, at 654, verifies the OTP from the user device. In one embodiment, the OTP verification process includes the authentication server generating an OTP based on the OTH using the authentication OTP generator unit. The OTP generated by the authentication server is compared with the user generated OTP at 664. If the OTPs do not match, the authentication server informs the application server at 682 that the transaction has not been authorized. This causes the user device to discard the hash value and session key from the authentication server at 641.

On the other hand, if the OTPs match, the transaction is authorized at 692. This also causes the user device to discard the hash value and session key from the authentication server at 641.

Figure 7:
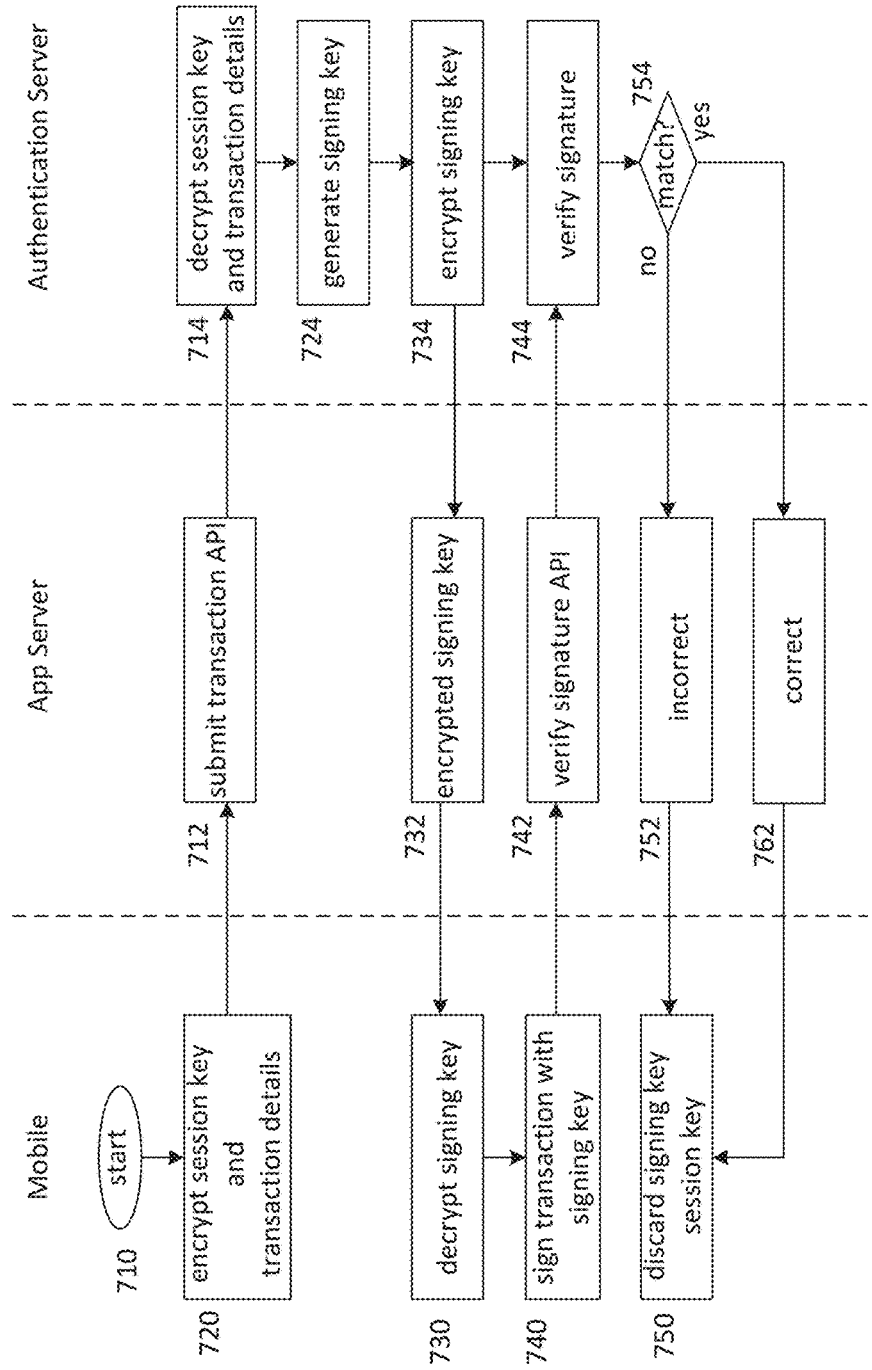
FIG. 7 shows an embodiment of a transaction authorization process flow using a one-time seed with one-time signing key.

FIG. 7 shows an embodiment of a transaction authorization flow 700 using an OTSK. The process, for example, authorizes a transaction between a user device and an application server. A user may initiate the App on the user device, such as a mobile device, at 710 to conduct a transaction with the application server. Initiating the App causes a session key to be generated at 720. The session key, for example, is generated by the session key generator of the front-end security module of the front-end App. The session key, for example, may be a 3DES session key. Other types of session keys, such as synchronous encryption keys, may also be useful.

The user initiates a transaction. The information or details of the transaction are created as part of the transaction. The transaction information may be provided using various techniques or a combination of techniques. For example, clicking, dialog boxes or input forms or a combination thereof may be employed to provide transaction information. Other techniques for obtaining information may also be employed. The transaction information is encrypted with the session key. In addition, the session key is encrypted using the public key stored in the user mobile device.

The encrypted transaction information and session key are submitted to the authentication server via the application server. In one embodiment, a call submit transaction API of the submit transaction unit at 712 transmits the encrypted information to the authentication server for processing. The authentication server, at 714, decrypts the session key using the private key on the authentication server and decrypts the transaction information using the decrypted session key.

The authentication server, at 724, generates a signing key. For example, the authentication server generates an OTSK using the OTSK generator unit. In one embodiment, the OTSK includes a private OTSK and a public OTSK. For example, the private OTSK serves as an electronic signature used by the user to sign the transaction using the OTSK generator unit. As for the public OTSK, it is used by the authentication server to verify the private OTSK or electronic signature of the signed transaction. The private OTSK may be referred to as the OTSK while the public OTSK may be referred to as the public key of the OTSK. The OTSK is encrypted, at 734, using the session key. Encrypting the OTSK using other encryption keys may also be useful. The encrypted OTSK is passed to the application server at 732 which is transmitted to the user device at 730.

The user device decrypts the OTSK, for example, with the session key. The decrypted OTSK is employed to sign the transaction at 740. The signed transaction is forwarded to the authentication server for authorization via the application server. In one embodiment, a call verify signature API of the signature verification sub-unit, at 742, requests the authentication server to verify the signed transaction.

The authentication server, at 744, verifies the signature of the signed transaction. In one embodiment, the signature verification process verifies the signature of the signed document using the OTSK's public key. If the OTSK of the signed document does not match at 754, the authentication server informs the application server at 752 that the transaction has not been authorized. This causes the user device to discard the OTSK and session key at 750. If the OTSK matches, the transaction is authorized at 762. This also causes the user device to discard the OTSK and session key at 750.

Figure 8A:
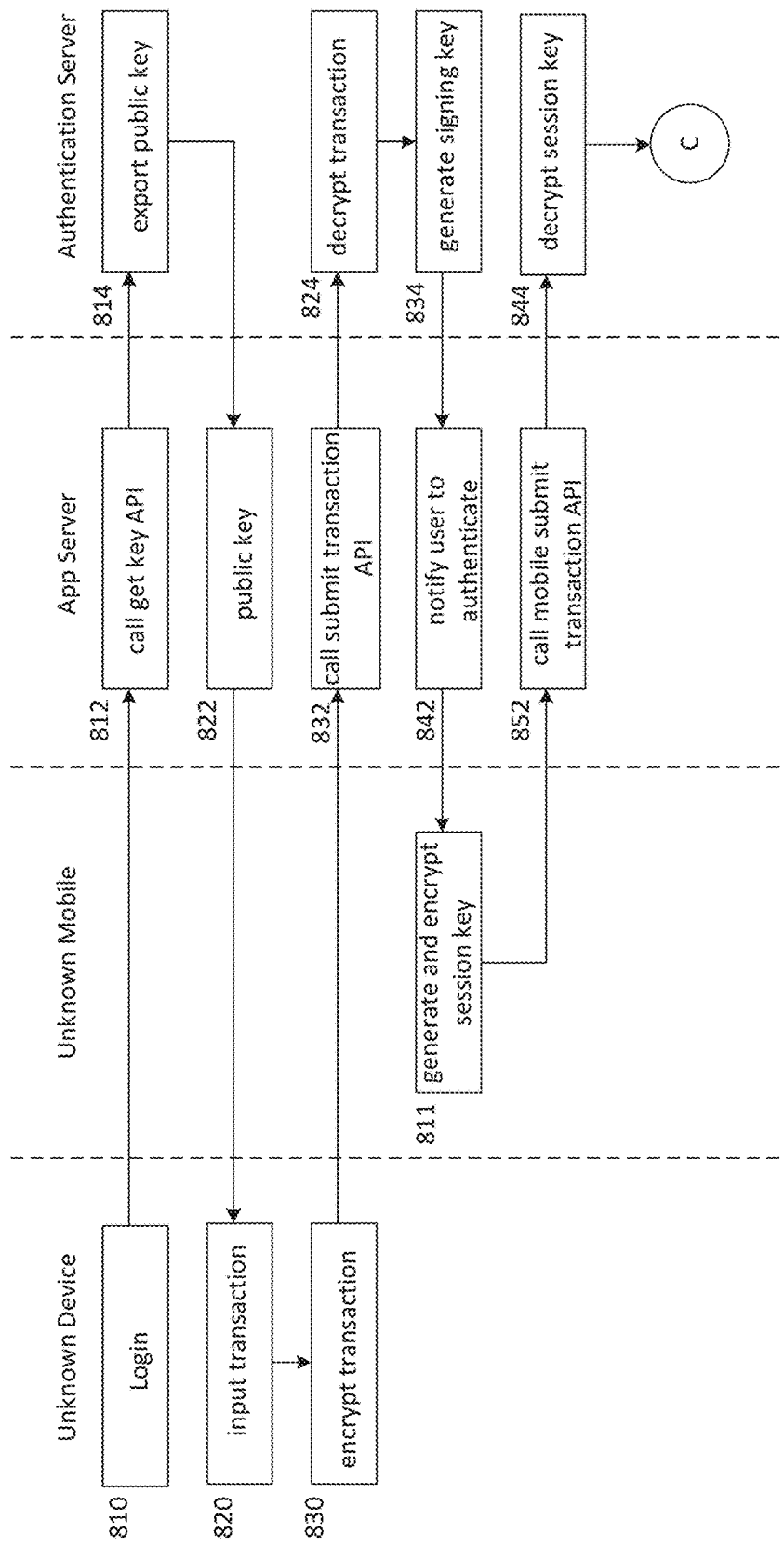
FIGS. 8a-8b show another embodiment of a transaction authorization process flow using a one-time seed with one-time signing key.
Figure 8B:
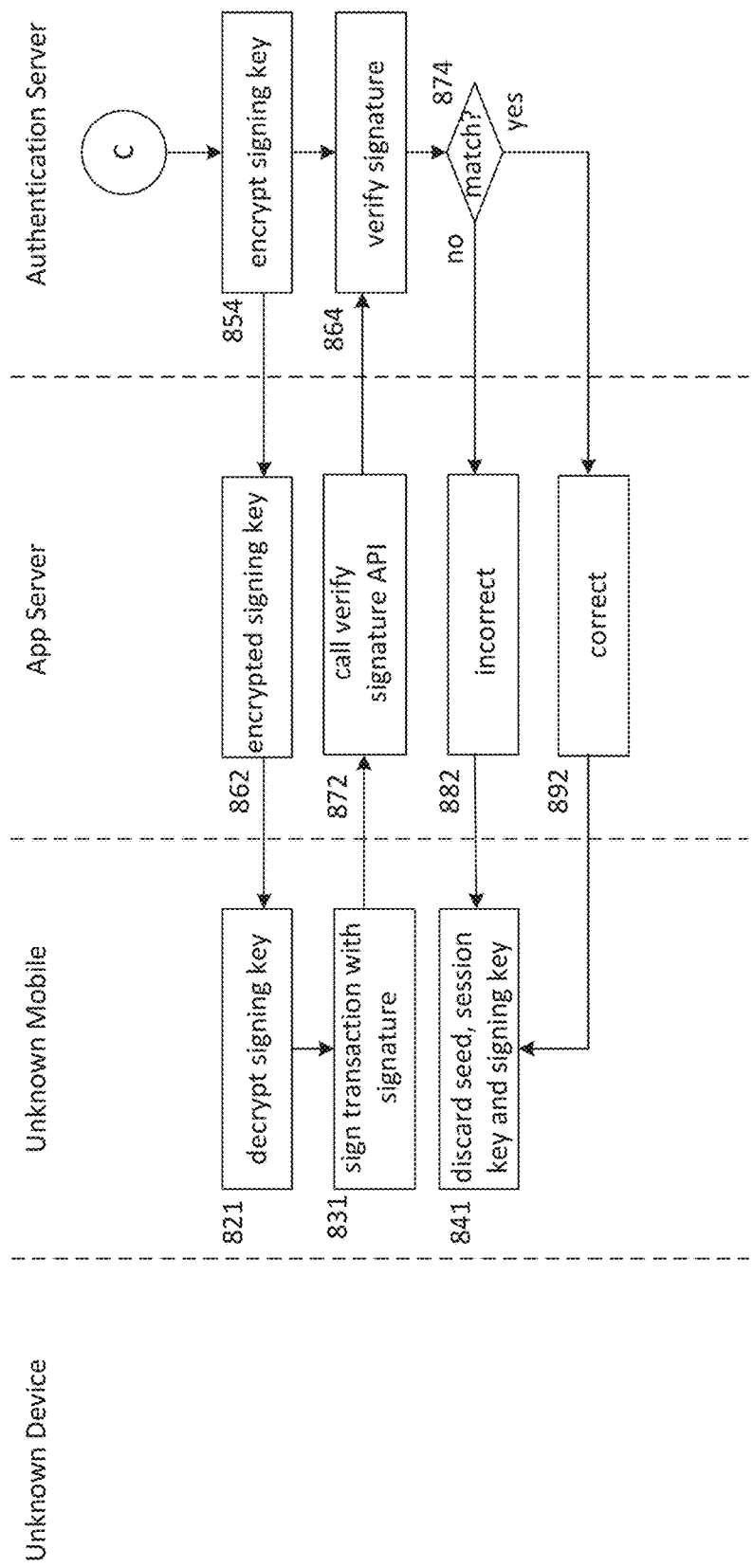

FIGS. 8a-8b show an embodiment of a transaction authorization flow 800 using an OTSK. As shown, the process may be performed or on an unauthenticated device, such as a device which is not known by the user or the system. In such case, the user may have the mobile or authenticated device present. The process is initiated on an unknown device at 810. The device may be a desktop device, a laptop, a tab device, a mobile device or another type of device which is unknown or unauthenticated. Since the unknown device is unauthenticated, the user must log into the application server using the user ID and password. For example, the user may direct the browser to the web-page of the application server to perform the login process to the application server.

Upon successful login by the user, the application server requests the authentication server for the user's public key at 812. For example, the application server initiates a call get public key API to the authentication server. The authentication server, at 814, exports the user's public key. The public key is passed to the application server at 822, which then is transmitted to the unknown device. The public key, for example, is stored in the browser of the unknown device.

By successfully logging in to the application server, the user can conduct the transaction with the application server using the unknown device at 820. The transaction information is encrypted using the public key of the user at 830.

The encrypted transaction information is submitted to the authentication server via the application server. In one embodiment, a call submit transaction API of the submit transaction unit at 832 transmits the encrypted information to the authentication server for processing. The authentication server, at 824, decrypts the transaction information using the user's private key stored in the authentication server. For example, the keys are stored in the user information database along with other information of the user.

The authentication server, at 834, generates a signing key. For example, the authentication server generates an OTSK using the OTSK generator unit. In one embodiment, the OTSK includes a private OTSK and a public OTSK. For example, the private OTSK serves as an electronic signature used by the user to sign the transaction using the OTSK signing unit. As for the public OTSK, it is used by the authentication server to verify the private OTSK or electronic signature of the signed transaction. The private OTSK may be referred to as the OTSK while the public OTSK may be referred to as the public key of the OTSK.

The authentication server notifies the application server for the user to authenticate the transaction from an unknown device at 842. The application server passes the notification to the mobile user device. For example, the user is notified by push notification to activate the App to authenticate the transaction. In response, the front-end application generates a session key at 811. The session key is encrypted with the user's public key. The encrypted session key is passed to the authentication server via the application. The application server passes the encrypted session key to the authentication server by a call mobile submit transaction API at 852.

The session key is decrypted using the private key at 844. The OTSK is encrypted, at 854, using the session key. Encrypting the OTSK using other encryption keys may also be useful. The encrypted OTSK is passed to the application server at 862 which is transmitted to the user device at 821.

The user device decrypts the OTSK, for example, with the session key. The decrypted OTSK is employed to sign the transaction at 831. The signed transaction is forwarded to the authentication server for authorization via the application server. In one embodiment, a call verify signature API of the signature verification sub-unit, at 872, requests the authentication server to verify the signed transaction.

The authentication server, at 864, verifies the signature of the signed transaction. In one embodiment, the signature verification process verifies the signature of the signed document using the OTSK's public key. If the OTSK of the signed document does not match at 874, the authentication server informs the application server at 882 that the transaction has not been authorized. This causes the user device to discard the signing key and session key at 841. If the OTSK matches, the transaction is authorized at 892. This also causes the user device to discard the signing key and session key at 841.

The various transaction authorization processes have been described using both session key and user key pairs. For example, a session key is generated by the user device which is encrypted by the user public. Subsequent information passed from the authentication server may be encrypted using the session key. However, it is understood that the processes may be modified to use only the user public and private keys. In other words, only asymmetrical encryption is employed. It is also further understood that encryption may be conducted using other keys. For example, encryption using session key may be encrypted using the public or private key instead.

Also, with respect to OTTAT using OTSK, in the case that the transaction details is too long, the authentication server may hash the transaction details to produce a transaction hash. The transaction hash may be sent back to the user security for signing with the private OTSK. This may speed up authenticating the transaction. After a transaction is authorized, whether using OTH or OTSK, known or unknown devices, the authentication sends the decrypted user information to the application server to complete the transaction As also described, the OTTAT and OTST provide strong authentication and transaction signing without changing any user experiences. For example, user experience will not be affected when it comes to authentication and transaction authorization. For example, a user will still have OTP have for second factor authentication. However, there is no seed stored in the user device.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. An authentication system for securing transactions between a first party and a second party comprising:
   a first party user device, the first party user device comprises a front-end application with a front-end transaction module and a front-end security module;
   a second party server, wherein the second party server comprises an application server, the second party application server comprises a back-end application with a back-end transaction module and a back-end security module;
   an authentication server, the authentication server comprises an authentication application with an authentication security module;
   a communication network, wherein the first party user device, the second party application server and the authentication server are interconnected by the communication network; and
   wherein, in response to an authentication request of the first party user device, the authentication security module of the authentication server performs an authentication of the first party user device, wherein the authentication comprises a generation phase and a verification phase,
   wherein the generation phase includes
      configuring the authentication security module to
         generate an authentication one-time seed (aOTS), and
         send the aOTS to the first party user device, and
      configuring the front-end security module first party user device to
         generate a user one-time password (uOTP) based on the aOTS received from the authentication server, and
         send the uOTP to the authentication server for verification,
   wherein the verification phase includes
      configuring the authentication security module to
         generate an authentication one-time password (aOTP) based on the aOTS received from the first party user device,
         compare the aOTP with the uOTP, wherein
            the first party user device is authenticated if the aOTP matches the uOTP, and
            the first party user device is not authenticated if the aOTP does not match the uOTP, and
      configuring the front-end security module to delete the aOTS and uOTP from the first party user device regardless whether the first party user device is authenticated or not.

2. The system of claim 1 wherein:
   the authentication security module generates an asymmetrical user encryption key pair upon successful registration of a user, the asymmetrical user encryption key pair comprises a user private key and a user public key;
   the authentication security module maintains the user private key; and
   the first party user device stores the user public key.

3. The system of claim 2 wherein authentication by the authentication security module comprises a 2-factor authentication having a first factor authentication and a second factor authentication, wherein:
   the first factor authentication comprises authenticating the user; and
   the second factor authentication comprises authenticating the first party user device.

4. An authentication system for securing transactions between a first party and a second party comprising:
   a first party user device, the first party user device comprises a front-end application with a front-end transaction module and a front-end security module;
   a second party server, wherein the second party server comprises an application server, the second party application server comprises a back-end application with a back-end transaction module and a back-end security module;
   an authentication server, the authentication server comprises an authentication application with an authentication security module, wherein the authentication security module generates an asymmetrical user encryption key pair upon successful registration of a user, the asymmetrical user encryption key pair comprises a user private key and a user public key, the authentication security module maintains the user private key, the first party user device stores the user public key;
a communication network, wherein the first party user device, the second party application server and the authentication server are interconnected by the communication network; and
wherein, in response to an authentication request of the first party user device, the authentication security module of the authentication server performs authentication of the first party user device comprising a 2-factor authentication having a first factor authentication and a second factor authentication, wherein:
the first factor authentication comprises authenticating the user, and
the second factor authentication comprises
authenticating the first party user device which includes
the front-end security module generating a session key,
the front-end security module encrypting the session key with the user public key to produce an encrypted session key, and
the front-end security module sending the encrypted session key to the authentication security module,
generating by the authentication security module an authentication one-time seed (aOTS) which is sent to the first party user device,
generating, by the front-end security module of the first party user device, a user one-time password (uOTP) based on the aOTS and sending the uOTP to the authentication server for verification,
generating, by the authentication security module, an authentication one-time password (aOTP) based on the aOTS,
comparing, by the authentication security module, the aOTP with the uOTP, wherein
the first party user device is authenticated if the aOTP matches the uOTP, and
the first party user device is not authenticated if the aOTP does not match the uOTP, and
deleting, by the front-end security module, the aOTS and uOTP from the first party user device regardless whether the first party user device is authenticated or not.

5. The system of claim 3 wherein the second factor authentication comprises:
the front-end security module generating a session key;
the front-end security module encrypting the session key along with details of the first party user device provided to the authentication server during registration with the user public key to produce an encrypted session key; and
the authentication security module verifying the details of the first party user device and terminating the second factor authentication if the details of the first party user device is not verified.

6. The system of claim 5 wherein the second factor authentication further comprises the authentication security module decrypting the encrypted session key using the private user key if the details of the first party user device is verified.

7. The system of claim 6 wherein communication of the authentication between the first party user device and the authentication server is facilitated by the back-end security module of the application server.

8. The system of claim 2 further comprises a secured transaction signing for securing the transaction with the second party application server.

9. The system of claim 8 wherein the secured transaction signing uses a one-time hash (OTH) by a user with an authenticated first party user device, the OTH transaction signing comprises:
the front-end security module of the first party user device
generating a session key, the session key is used to encrypt transaction information of the transaction to produce an encrypted transaction information, encrypting the session key with the user public key to produce an encrypted session key, wherein the encrypted transaction information and encrypted session key employ hybrid asymmetrical and symmetrical encryption, and sending the encrypted transaction information and encrypted session key to the authentication server via the application server;
the authentication security module
decrypting the encrypted session key using the user private key to produce a decrypted session key,
decrypting the encrypted transaction information using the decrypted session key,
generating an OTH value from the decrypted transaction information,
encrypting the OTH value using the decrypted session key to produce an encrypted OTH value, and
sending the encrypted OTH value to the front-end security module of the first party user device via the back-end security module of the second party application server;
the front-end security module of the first party user device
decrypting the encrypted OTH value with the session key to produce a decrypted OTH value which serves as the OTH,
generating a user one-time password (uOTP) based on the decrypted OTH value, and
sending the uOTP to the authentication server via the back-end security module of the second party application server for verification;
the authentication security module verifying the uOTP by generating an authentication one-time password (aOTP) using the OTH value, wherein
if the uOTP matches the aOTP, the uOTP is verified and the transaction is authorized, and
if the uOTP does not match the aOTP, the uOTP is not verified and the transaction is not authorized; and
the front-end security module deleting the uOTP and session key from the first party user device regardless whether the uOTP is verified or not by the authentication server.

10. The system of claim 8 wherein the secured transaction signing uses a one-time hash (OTH) by a user with an authenticated first party user device using an unknown device, the OTH transaction signing comprises:
the application server retrieving the user public key from the authentication server and sending it to the unknown device after the user successfully logs into the application server using the unknown device;
the unknown device encrypting transaction information using the user public key to produce an encrypted transaction information which is submitted to the authentication server via the back-end security module;
the authentication server decrypting the encrypted transaction information using the user private key and informing the user to activate the front-end application;

upon activation of the front-end application by the user, the front-end security module
generating a session key,
encrypting the session key with the user public key to produce an encrypted session key, and
sending the encrypted session key to the authentication server via the application server;
the authentication security module
decrypting the encrypted session key using the user private key to produce a decrypted session key,
generating an OTH value from the decrypted transaction information,
encrypting the OTH value using the decrypted session key to produce an encrypted OTH value, and
sending the encrypted OTH value to the front-end security module of the first party user device via the back-end security module of the second party application server;
the front-end security module of the first party user device
decrypting the encrypted OTH value with the session key to produce a decrypted OTH value which serves as the OTH,
generating a user one-time password (uOTP) based on the decrypted OTH value, and
sending the uOTP to the authentication server via the back-end security module of the second party application server for verification;
the authentication security module verifying the uOTP by generating an authentication one-time password (aOTP) using the OTH value, wherein
if the uOTP matches the aOTP, the uOTP is verified and the transaction is authorized, and
if the uOTP does not match the aOTP, the uOTP is not verified and the transaction is not authorized;
the front-end security module deleting the uOTP from the first party user device regardless whether the uOTP is verified or not by the authentication server; and
the back-end application completing the transaction between the unknown device and the application server if the transaction is authorized.

11. The system of claim 8 wherein the secured transaction signing uses a one-time signing key (OTSK) by a user with an authenticated first party user device, the OTSK transaction signing comprises:
the front-end security module of the first party user device
generating a session key, the session key is used to encrypt transaction information of the transaction to produce an encrypted transaction information, encrypting the session key with the user public key to produce an encrypted session key, wherein the encrypted transaction information and encrypted session key employ hybrid asymmetrical and symmetrical encryption, and sending the encrypted transaction information and encrypted session key to the authentication server via the application server;
the authentication security module of the authentication server
decrypting the encrypted session key using the user private key to produce a decrypted session key,
decrypting the encrypted transaction information using the decrypted session key,
generating an OTSK set, the OTSK set includes a private OTSK and a public OTSK, wherein the private OTSK serves as an electronic signature of the user,
encrypting the private OTSK using the decrypted session key to produce an encrypted OTSK, and
sending the encrypted OTSK to the front-end security module of the first party user device via the back-end security module of the second party application server;
the front-end security module of the first party user device
decrypting the encrypted OTSK with the session key to produce a decrypted OTSK,
signing the transaction with the decrypted OTSK to produce a signed transaction, and
sending the signed transaction to the authentication server via the back-end security module of the second party application server for verification;
the authentication security module verifying the electronic signature of the signed transaction using the public OTSK, wherein
if the electronic signature is verified, the transaction is authorized, and
if the electronic signature is not verified, the transaction is not authorized; and
the front-end security module deleting the OTSK and session key from the first party user device regardless whether the electronic signature is verified or not by the authentication server.

12. The system of claim 8 wherein the secured transaction signing uses a one-time signing key (OTSK) by a user with an authenticated first party user device using an unknown device, the OTSK transaction signing comprises:
the application retrieving the user public key from the authentication server and sending it to the unknown device after the user successfully logs into the application server using the unknown device;
the unknown device encrypting transaction information using the user public key to produce an encrypted transaction information which is submitted to the authentication server via the back-end security module;
the authentication server decrypting the encrypted transaction information using the user private key and informing the user to activate the front-end application;
upon activation of the front-end application by the user, the front-end security module
generating a session key,
encrypting the session key with the user public key to produce an encrypted session key, and
sending the encrypted session key to the authentication server via the application server;
the authentication security module
decrypting the encrypted session key using the user private key to produce a decrypted session key,
generating an OTSK set, the OTSK set includes a private OTSK and a public OTSK, wherein the private OTSK serves as an electronic signature of the user,
encrypting the private OTSK using the decrypted session key to produce an encrypted OTSK, and
sending the encrypted OTSK to the front-end security module of the first party user device via the back-end security module of the second party application server;
the front-end security module of the first party user device
decrypting the encrypted OTSK with the session key to produce a decrypted OTSK,
signing the transaction with the decrypted OTSK to produce a signed transaction, and
sending the signed transaction to the authentication server via the back-end security module of the second party application server for verification;

the authentication security module verifying the electronic signature of the signed transaction using the public OTSK, wherein
if the electronic signature is verified, the transaction is authorized, and
if the electronic signature is not verified, the transaction is not authorized;
the front-end security module deleting the OTSK and session key from the first party user device regardless whether the electronic signature is verified or not by the authentication server; and
the back-end application completing the transaction between the unknown device and application server if the transaction is authorized.

13. The system of claim 2 wherein registration of the user comprises:
the user entering user information of the user including user identification (user ID), user password and the first party user device information;
the second party application server receiving the user information entered and sending it to the authentication server for verification;
the authentication server verifying that the user ID and user password of the user matches existing user information stored in a user authentication database, wherein
if the user information of the user is not verified, the authentication server informs the second party application server which terminates the registration process, and
if the user information of the user is verified, the authentication server generates a first registration one-time password (rOTP) and sends it to the first party user device;
the first party user device receiving the first rOTP from the user and sending it for verification by the authentication server via the back-end security module on the second party application server;
the authentication server verifying the first rOTP input, wherein
if the first rOTP is not verified, the authentication server causes the registration process to terminate, and
if the first rOTP is verified, the authentication server generates an asymmetrical encryption key pair for the user, the asymmetrical user encryption key pair comprises the user private key and the user public key,
generates a registration one-time seed (rOTS), and
sends the rOTS and user public key to the first party user device via the back-end security module on the second party application server;
the front-end security module on the first party user device generating a second rOTP based on the rOTS and sending it to the authentication server for verification via the second party application server; and
the authentication server verifying the second rOTP, wherein
if the second rOTP from the user is not verified, the authentication server is informed and causes the rOTS and user public key to be deleted from the first party user device, and
if the second rOTP from the user is verified, registration is successful and the application server is informed and causes the rOTS to be deleted from the first party user device and the user public key to be stored in the first party user device.

14. A user device comprising:
a user application, wherein the user application is downloaded from an application server, the user application comprises
a front-end transaction module for facilitating a transaction with a back-end application on the application server, and
a front-end security module, wherein the front-end security module, in response to receiving a one-time seed (OTS) originating from an authentication server, is configured
to generate a one-time password (OTP) based on the OTS received from the first party user device,
to transmit the OTP to the authentication server for performing an authentication process, wherein authentication by the authentication server includes the authentication server generating an authentication OTP (aOTP) based on the OTS and comparing the aOTP with the OTP, and
to delete the OTS and OTP from the user device regardless whether the authentication process is successful or not.

15. The user device of claim 14 wherein the front-end security module comprises a set of asymmetrical user encryption keys comprising a user public key and a user private key, the asymmetrical user encryption keys are generated by the authentication server upon successful registration of a user of the user application in the user device.

16. An authentication server for facilitating secured transactions, the authentication server includes an authentication security module, the authentication security module comprises:
an authentication key generator unit for generating a user asymmetrical key pair having a user public key and a user private key of a user, the user asymmetrical key pair is generated in response to successful registration of the user;
an authentication encryption unit, the authentication encryption unit includes symmetrical and asymmetrical encryption, wherein
the asymmetrical encryption includes use of the user asymmetrical key pair, and
the symmetrical encryption includes use of a session key from a first party user device;
a seed generator unit for generating a one-time seed (OTS) which is used by the first party user device to generate a user one-time password (uOTP);
a one-time password (OTP) generator unit for generating an authentication one-time password (aOTP) based on the OTS; and
an authentication verification unit for verifying
a registration one-time password (rOTP) from the first party user device for registering the user, the rOTP is based against the aOTP,
the uOTP received from the first party user device for authenticating the first party user device and authorizing a transaction by the user with a second party application server, the uOTP is verified against the aOTP, and
wherein after registration, authentication and transaction authorization, the authentication security module causes the OTS in the first party user device to be deleted.

17. An application server having an application processor and an application storage, the application server comprising a back-end application, the back-end application comprises:
a back-end transaction module, the back-end transaction module is configured to communicate with a front-end transaction module on a user device with a user device processor and a user device storage, the backend transaction module is employed for conducting a transaction between a user using the user device and the application server;

a back-end security module, the back-end security includes a back-end verification unit for facilitating communication between the user device and an authentication server for verifying a user one-time password (uOTP) generated from the user device, the uOTP is based on a one-time seed (OTS) generated by the authentication server and passed to the user device via the back-end security module, wherein verifying the uOTP by the authentication server includes comparing the uOTP with an authentication OTP (aOTP) which is generated by the authentication server based on the OTS; and wherein after verification, regardless whether the uOTP is verified or not verified by the authentication server, the back-end security module causes the user device to delete the OTS and uOTP from the user device.

18. A method of conducting a secured transaction comprising:

providing a user with a user device, the user device includes a transaction application downloaded from an application server and installed on the user device, the transaction application includes a transaction module and a front-end security module;

registering the user with the application server which includes providing user information comprising user identification (userID) and user password of the user and information of the user device to the application server;

upon successful registration, storing a user public key from the authentication server to the user device, the user public key is part of a key pair having a user private key and the user public key;

authenticating the user device after successful registration, wherein authenticating the user device comprises a 2-factor device authentication having a first factor device authentication and a second factor device authentication, wherein the first factor device authentication includes
configuring the user device to
generate a session key,
encrypt the session key and device information with the user public key for processing by the authentication server, and
receive a one-time seed (OTS) from the authentication server upon successful first factor device authentication, and the second factor device authentication includes
configuring the user device to
generate a user one-time password (uOTP) based on a one-time seed (OTS) received from the authentication server upon successful first factor device authentication,
send the uOTP to the authentication server, and
configuring the authentication server to
generate an authentication one-time password (aOTP) based on the aOTS, and
authenticate the uOTP by comparing the uOTP with the aOTP;

deleting the OTS from the user device regardless whether the device authentication is successful or not; and conducting the secured transaction with the application server after successful device authentication.

19. The method of claim 18 wherein conducting the secured transaction with the application server comprises a transaction authorization process using a transaction OTS (tOTS) which is deleted after conducting the secured transaction, regardless whether the secured transaction is authorized or not.

20. The method of claim 19 wherein the transaction authorization process comprises a one-time transaction authorization technology (OTTAT) which is based on:

a one-time hash (OTH) generated from transaction information to serve as the tOTS to generate a transaction OTP (tOTP); or a one-time signing key (OTSK) for signing the transaction information; and wherein the OTH or OTSK are deleted from the user device after the transaction authorization process is completed.

* * * * *